US012754922B2

(12) United States Patent
Espel-Logan et al.

(10) Patent No.: US 12,754,922 B2
(45) Date of Patent: Oct. 6, 2026

(54) ARTIFICIAL INTELLIGENCE-BASED QUERY AND RESPONSE SYSTEMS AND METHODS

(71) Applicant: State Farm Mutual Automobile Insurance Company, Bloomington, IL (US)

(72) Inventors: Catherine Espel-Logan, Plano, TX (US); Jason L. Keeney, Auburntown, TX (US); Chelli D. Whitaker, Maricopa, AZ (US); Laura E. Chambers, Oak Ridge, TN (US); Amit Kumar Gupta, Normal, IL (US); Tosha Bell, Atlanta, GA (US); David K. Hundley, Bloomington, IL (US); Daniel Johnson, Dunnellon, FL (US); Judd Morgan, Mahomet, IL (US); Justin D. Dirr, Los Angeles, CA (US); Bhanu Cattamanchi, Suwanee, GA (US); Marigona Bokshi-Drotar, Issaquah, WA (US); Minsup Lee, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 19/053,847

(22) Filed: Feb. 14, 2025

(65) Prior Publication Data

US 2026/0244626 A1 Aug. 20, 2026

(51) Int. Cl.
*G06F 16/248* (2019.01)
*G06F 16/2457* (2019.01)

(52) U.S. Cl.
CPC ...... *G06F 16/24578* (2019.01); *G06F 16/248* (2019.01)

(58) Field of Classification Search
CPC ......................... G06F 16/248; G06F 16/24578
See application file for complete search history.

(56) References Cited

U.S. PATENT DOCUMENTS 11,102,276 B2 8/2021 Byron et al.
12,001,462 B1 * 6/2024 Madisetti .............. G06F 40/284
(Continued)

FOREIGN PATENT DOCUMENTS

CN 117009490 A 11/2023
CN 117542471 A 2/2024
(Continued)

*Primary Examiner* — Tarek Chbouki
(74) *Attorney, Agent, or Firm* — Armstrong Teasdale LLP

(57) ABSTRACT

An AI-based computing system for responding in real-time to an inbound message including a processor that is programmed to cause to display, within a graphical user interface i) a proposed response message responsive to a query message, the proposed response message being generated by an AI response model, ii) a link to one or more relevant documents retrieved from a corresponding subject-category database, and iii) a feedback input enabling a representative to assign a response indicator. The processor is programmed to receive a response indicator for the proposed response message and create a historical record. The processor is programmed to generate a training dataset and re-train the AI response model using the training dataset. The processor is programmed to cause to display, within the graphical user interface, in real-time, a revised response message responsive to the current inbound message using the re-trained AI response model.

20 Claims, 10 Drawing Sheets

(56) References Cited

U.S. PATENT DOCUMENTS

| | | | | |
|---|---|---|---|---|
| 2015/0254353 | A1 | 9/2015 | Gulwani et al. | |
| 2021/0295822 | A1* | 9/2021 | Tomkins | G10L 15/197 |
| 2022/0391595 | A1 | 12/2022 | Shevelev et al. | |
| 2023/0350962 | A1* | 11/2023 | Kanza | G06F 16/9538 |
| 2024/0249083 | A1* | 7/2024 | Mei | G06F 40/30 |
| 2024/0273123 | A1 | 8/2024 | Costa et al. | |
| 2024/0289863 | A1 | 8/2024 | Smith Lewis et al. | |
| 2024/0312081 | A1* | 9/2024 | Ponomarenko | G06T 11/206 |
| 2025/0238347 | A1* | 7/2025 | Sateli | G06F 9/451 |
| 2025/0291827 | A1 | 9/2025 | Chong | |
| 2025/0322273 | A1* | 10/2025 | Voonna | G06N 20/00 |

FOREIGN PATENT DOCUMENTS

| | | | |
|---|---|---|---|
| CN | 117828042 | A | 4/2024 |
| CN | 118069811 | A | 5/2024 |
| CN | 118170802 | A | 6/2024 |
| CN | 118195032 | A | 6/2024 |
| CN | 118377863 | A | 7/2024 |
| CN | 118446320 | A | 8/2024 |
| CN | 118469021 | A | 8/2024 |

* cited by examiner

ARTIFICIAL INTELLIGENCE-BASED QUERY AND RESPONSE SYSTEMS AND METHODS

FIELD OF THE DISCLOSURE

The present disclosure relates to artificial intelligence (AI) and, more particularly, to AI-based systems and methods that are configured to train and execute an AI model in response to receiving request messages from requestors, wherein the request message may include a request for technical information.

BACKGROUND

In order to effectively run many different types of businesses in today's technical environment, many of these businesses may be required to provide timely and effective support to its agents or employees. For example, an employee who is required to provide goods and services to a consumer may be required to answer certain technical questions that the consumer may have about the goods and/or services. Those employees may be required to spend substantial amounts of time and money researching these issues in order to provide responses back to the consumer. In some cases, the business may be structured in such a manner where the employees providing the information are associates tasked with determining responses and if necessary, requesting assistance from one or more subject matter experts who may provide additional or alternative information to the associate who can then provide it to the requestor. In some cases, the requestor is an agent, subcontractor, or representative that subsequently provides the response or information to the consumer. In many cases, these subject matter experts must have a specialized knowledge base so as to quickly find the correct answers for the requestor and provide the answers in a short and understandable manner. Unfortunately, this is a difficult and time consuming task, especially when the turnover rate of these subject matter experts can be quite high. Thus, each time a subject matter expert is promoted or leaves the company, a knowledge base is lost.

In addition, analysis of large businesses systems typically requires significant amounts of data and time to determine if there are issues that need to be addressed and determine how solutions to those issues should be implemented. Furthermore, some analysis systems may have significant numbers of inputs and variables that affect the ease and time for analysis. Large language models (LLM) may be used for analysis of many systems. However, they are not a one size fits all solution. In other words, not all LLMs can be used to address the issues and requests for information by employees within a business.

Many systems have special features that may or may not be handled by the standard large language model. For example, one line of business where numerous technical questions arise is in the insurance industry area. These numerous questions arise on a daily basis and must be responded to quickly and accurately. This process may include reviewing and screening inbound messages and identifying documents that may be used to generate a response. This includes the work of associates or subject matter experts who draft the responses and review and approve the responses before they are submitted back to users or agents. The process of responding is manual in nature where the associate or subject matter expert may leverage multiple sources of information and consult with other associates or experts in order to come up with responses. While LLMs may be used to assist in this process, there is limited ability to integrate the feedback from an associate reviewing proposed responses and/or identified relevant documents. In addition, these known systems are unable to provide these responses in real-time while using LLMs.

The ability to use large language models (LLMs) and generative AI (artificial intelligence) to address the challenges of generating and submitting responses to such inquiries in real-time is needed. Conventional large language models and generative AI tools do not currently address these challenges. Conventional techniques may have additional ineffectiveness, inefficiencies, encumbrances, and/or other drawbacks, as well.

BRIEF SUMMARY

The present embodiments may relate to an AI-based computing system for responding in real-time to an inbound message including a processor that is programmed to cause to display, within a graphical user interface i) a proposed response message responsive to a query message, the proposed response message being generated by an AI response model, ii) a link to one or more relevant documents retrieved from a corresponding subject-category database, and iii) a feedback input enabling a representative to assign a response indicator. The processor is programmed to receive a response indicator for the proposed response message and create a historical record. The processor is programmed to generate a training dataset and re-train the AI response model using the training dataset. The processor is programmed to cause to display, within the graphical user interface, in real-time, a revised response message responsive to the current inbound message using the re-trained AI response model.

In one aspect, a computing system for responding in real-time to an inbound message may be provided. The computing system may include one or more local or remote processors, servers, transceivers, sensors, memory units, mobile devices, wearables, smart watches, smart contact lenses, smart glasses, augmented reality glasses, virtual reality headsets, mixed or extended reality glasses or headsets, voice bots, chatbots, ChatGPT or ChatGPT-based bots, and/or other electronic or electrical components, which may be in wired or wireless communication with one another. For example, in one instance, the computing system may include at least one memory for storing a plurality of subject-category databases and at least one processor in communication with the at least one memory. Each subject-category database includes one or more documents associated with the respective subject-category of the subject-category database. The at least one processor may be programmed to: a) cause to display, within a graphical user interface of a representative computing device, i) a proposed response message responsive to a query message derived from a current inbound message submitted by a user, the proposed response message being generated by an AI response model, ii) a link to one or more relevant documents retrieved from a corresponding subject-category database, and iii) a feedback input enabling a representative to assign a response indicator to the proposed response message, b) receive, from the representative computing device, a response indicator for the proposed response message assigned by the representative via the feedback input, c) create a historical record including the proposed response message and the response indicator, d) generate a training dataset including a plurality of historical records, e) using machine learning and/or artificial intelligence tools, re-train the AI response model using the training dataset, and f) in response to a request for a revised response message, cause to display, within the graphical user interface of the representative computing device, in real-time, a revised response message responsive to the current inbound message using the re-trained AI response model.

In another aspect, a computer-implemented method for responding in real-time to an inbound message may be provided. The computer-implemented method may be implemented via one or more local or remote processors, servers, transceivers, sensors, memory units, mobile devices, wearables, smart watches, smart contact lenses, smart glasses, augmented reality (AR) glasses, virtual reality (VR) headsets, mixed reality (MR) or extended reality (XR) glasses or headsets, voice bots or chatbots, ChatGPT or ChatGPT-based bots, and/or other electronic or electrical components, which may be in wired or wireless communication with one another. For example, in one instance, the computer-implemented method may be implemented by a computing system including at least one memory for storing a plurality of subject-category databases and at least one processor in communication with the at least one memory. Each subject-category database includes one or more documents associated with the respective subject-category of the subject-category database. The method may include: a) causing to display, within a graphical user interface of a representative computing device, i) a proposed response message responsive to a query message derived from a current inbound message submitted by a user, the proposed response message being generated by an AI response model, ii) a link to one or more relevant documents retrieved from a corresponding subject-category database, and iii) a feedback input enabling a representative to assign a response indicator to the proposed response message, b) receiving, from the representative computing device, a response indicator for the proposed response message assigned by the representative via the feedback input, c) creating a historical record including the proposed response message and the response indicator, d) generating a training dataset including a plurality of historical records, e) using machine learning and/or artificial intelligence tools, re-training the AI response model using the training dataset, and f) in response to a request for a revised response message, causing to display, within the graphical user interface of the representative computing device, in real-time, a revised response message responsive to the current inbound message using the re-trained AI response model.

In yet another aspect, at least one non-transitory computing-readable media having computing-executable instructions embodied thereon may be provided. The computing-executable instructions may be executed by a computing system at least one memory for storing a plurality of subject-category databases and at least one processor in communication with the at least one memory. Each subject-category database includes one or more documents associated with the respective subject-category of the subject-category database. The computing-executable instructions may direct or cause the at least one processor to: a) cause to display, within a graphical user interface of a representative computing device, i) a proposed response message responsive to a query message derived from a current inbound message submitted by a user, the proposed response message being generated by an AI response model, ii) a link to one or more relevant documents retrieved from a corresponding subject-category database, and iii) a feedback input enabling a representative to assign a response indicator to the proposed response message, b) receive, from the representative computing device, a response indicator for the proposed response message assigned by the representative via the feedback input, c) create a historical record including the proposed response message and the response indicator, d) generate a training dataset including a plurality of historical records, e) using machine learning and/or artificial intelligence tools, re-train the AI response model using the training dataset, and f) in response to a request for a revised response message, cause to display, within the graphical user interface of the representative computing device, in real-time, a revised response message responsive to the current inbound message using the re-trained AI response model.

In one aspect, An AI-based computing system for responding in real-time to an inbound message may be provided. The computing system may include one or more local or remote processors, servers, transceivers, sensors, memory units, mobile devices, wearables, smart watches, smart contact lenses, smart glasses, augmented reality glasses, virtual reality headsets, mixed or extended reality glasses or headsets, voice bots, chatbots, ChatGPT or ChatGPT-based bots, and/or other electronic or electrical components, which may be in wired or wireless communication with one another. For example, in one instance, the computing system may include at least one memory for storing a plurality of subject-category databases and at least one processor in communication with the at least one memory. Each subject-category database includes one or more documents associated with the respective subject-category of the subject-category database. The at least one processor may be programmed to: a) transmit, to a representative computing device, an AI model generated proposed response message responsive to a query message derived from the inbound message, b) receive, from the representative computing device, feedback associated with the AI model generated proposed response message, the feedback provided by a representative, c) create a historical record including the AI model generated proposed response message and the feedback, d) generate a training dataset including at least the created historical record, and f) using machine learning and/or artificial intelligence techniques, re-train the AI model using the training dataset.

In another aspect, an AI computer-based method for responding in real-time to an inbound message may be provided. The computer-implemented method may be implemented via one or more local or remote processors, servers, transceivers, sensors, memory units, mobile devices, wearables, smart watches, smart contact lenses, smart glasses, augmented reality (AR) glasses, virtual reality (VR) headsets, mixed reality (MR) or extended reality (XR) glasses or headsets, voice bots or chatbots, ChatGPT or ChatGPT-based bots, and/or other electronic or electrical components, which may be in wired or wireless communication with one another. For example, in one instance, the computer-implemented method may be implemented by a computing system including at least one memory for storing a plurality of subject-category databases and at least one processor in communication with the at least one memory. Each subject-category database includes one or more documents associated with the respective subject-category of the subject-category database. The method may include: a) transmitting, to a representative computing device, an AI model generated proposed response message responsive to a query message derived from the inbound message, b) receiving, from the representative computing device, feedback associated with the AI model generated proposed response message, the feedback provided by a representative, c) creating a historical record including the AI model generated proposed response message and the feedback, d) generating a training dataset including at least the created historical record, and c) using machine learning and/or artificial intelligence techniques, re-training the AI model using the training dataset.

In yet another aspect, at least one non-transitory computer-readable storage media having computer-executable instructions embodied thereon for responding in real-time to an inbound message may be provided. The computing-executable instructions may be executed by a computing system at least one memory for storing a plurality of subject-category databases and at least one processor in communication with the at least one memory. Each subject-category database includes one or more documents associated with the respective subject-category of the subject-category database. The computing-executable instructions may direct or cause the at least one processor to: a) transmit, to a representative computing device, an AI model generated proposed response message responsive to a query message derived from the inbound message, b) receive, from the representative computing device, feedback associated with the AI model generated proposed response message, the feedback provided by a representative, c) create a historical record including the AI model generated proposed response message and the feedback, e) generate a training dataset including at least the created historical record, and f) using machine learning and/or artificial intelligence techniques, re-train the AI model using the training dataset.

In one aspect, an AI-based computing system for responding in real-time to an inbound message may be provided. The computing system may include one or more local or remote processors, servers, transceivers, sensors, memory units, mobile devices, wearables, smart watches, smart contact lenses, smart glasses, augmented reality glasses, virtual reality headsets, mixed or extended reality glasses or headsets, voice bots, chatbots, ChatGPT or ChatGPT-based bots, and/or other electronic or electrical components, which may be in wired or wireless communication with one another. For example, in one instance, the computing system may include at least one memory for storing a plurality of subject-category databases and at least one processor in communication with the at least one memory. Each subject-category database includes one or more documents associated with the respective subject-category of the subject-category database. The at least one processor may be programmed to: a) receive an inbound message from a requestor computing device, b) parse the inbound message to generate a query, c) determine one or more keywords contained within the query, d) identify, based in part on the keywords, a subject-matter category database from the plurality of subject-matter category databases that is responsive to the one or more keywords, e) search the identified subject-matter category database to determine one or more relevant documents, wherein the one or more relevant documents include information responsive to the query, f) input the determined one or more relevant documents into a generative AI model to generate one or more model outputs including a proposed response message responding to the inbound message and a relevancy score for each of the relevant documents, the relevancy score indicating a level of relevance and responsiveness of the document to the inbound message, and g) transmit a notification message to a representative computing device, wherein the notification message includes one or more of the following: i) the proposed response message, ii) a selectable link associated with the determined one or more relevant documents, and iii) the relevancy score for each of the one or more relevant documents.

In another aspect, an AI computer-based method for responding in real-time to an inbound message may be provided. The computer-implemented method may be implemented via one or more local or remote processors, servers, transceivers, sensors, memory units, mobile devices, wearables, smart watches, smart contact lenses, smart glasses, augmented reality (AR) glasses, virtual reality (VR) headsets, mixed reality (MR) or extended reality (XR) glasses or headsets, voice bots or chatbots, ChatGPT or ChatGPT-based bots, and/or other electronic or electrical components, which may be in wired or wireless communication with one another. For example, in one instance, the computer-implemented method may be implemented by a computing system including at least one memory for storing a plurality of subject-category databases and at least one processor in communication with the at least one memory. Each subject-category database includes one or more documents associated with the respective subject-category of the subject-category database. The method may include: a) receiving an inbound message from a requestor computing device, b) parsing the inbound message to generate a query, c) determining one or more keywords contained within the query, d) identifying, based in part on the keywords, a subject-matter category database from a plurality of subject-matter category databases that is responsive to the one or more keywords, e) searching the identified subject-matter category database to determine one or more relevant documents, wherein the one or more relevant documents include information responsive to the query, f) inputting the determined one or more relevant documents into a generative AI model to generate one or more model outputs including a proposed response message responding to the inbound message and a relevancy score for each of the relevant documents, the relevancy score indicating a level of relevance and responsiveness of the document to the inbound message, and g) transmit a notification message to a representative computing device, wherein the notification message includes one or more of the following: i) the proposed response message, ii) a selectable link associated with the determined one or more relevant documents, and iii) the relevancy score for each of the one or more relevant documents.

In yet another aspect, At least one non-transitory computer-readable storage media having computer-executable instructions embodied thereon for responding in real-time to an inbound message may be provided. The computing-executable instructions may be executed by a computing system at least one memory for storing a plurality of subject-category databases and at least one processor in communication with the at least one memory. Each subject-category database includes one or more documents associated with the respective subject-category of the subject-category database. The computing-executable instructions may direct or cause the at least one processor to: a) receive an inbound message from a requestor computing device, b) parse the inbound message to generate a query, c) determine one or more keywords contained within the query, d) identify, based in part on the keywords, a subject-matter category database from a plurality of subject-matter category databases that is responsive to the one or more keywords, e) search the identified subject-matter category database to determine one or more relevant documents, wherein the one or more relevant documents include information responsive to the query, f) input the determined one or more relevant documents into a generative AI model to generate one or more model outputs including a proposed response message responding to the inbound message and a relevancy score for each of the relevant documents, the relevancy score indicating a level of relevance and responsiveness of the document to the inbound message, and g) transmit a notification message to a representative computing device, wherein the notification message includes one or more of the following: i) the proposed response message, ii) a selectable link associated with the determined one or more relevant documents, and iii) the relevancy score for each of the one or more relevant documents.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed herein. It should be understood, however, that the present embodiments are not limited to the precise arrangements and/or instrumentalities shown herein.

Figure 1:
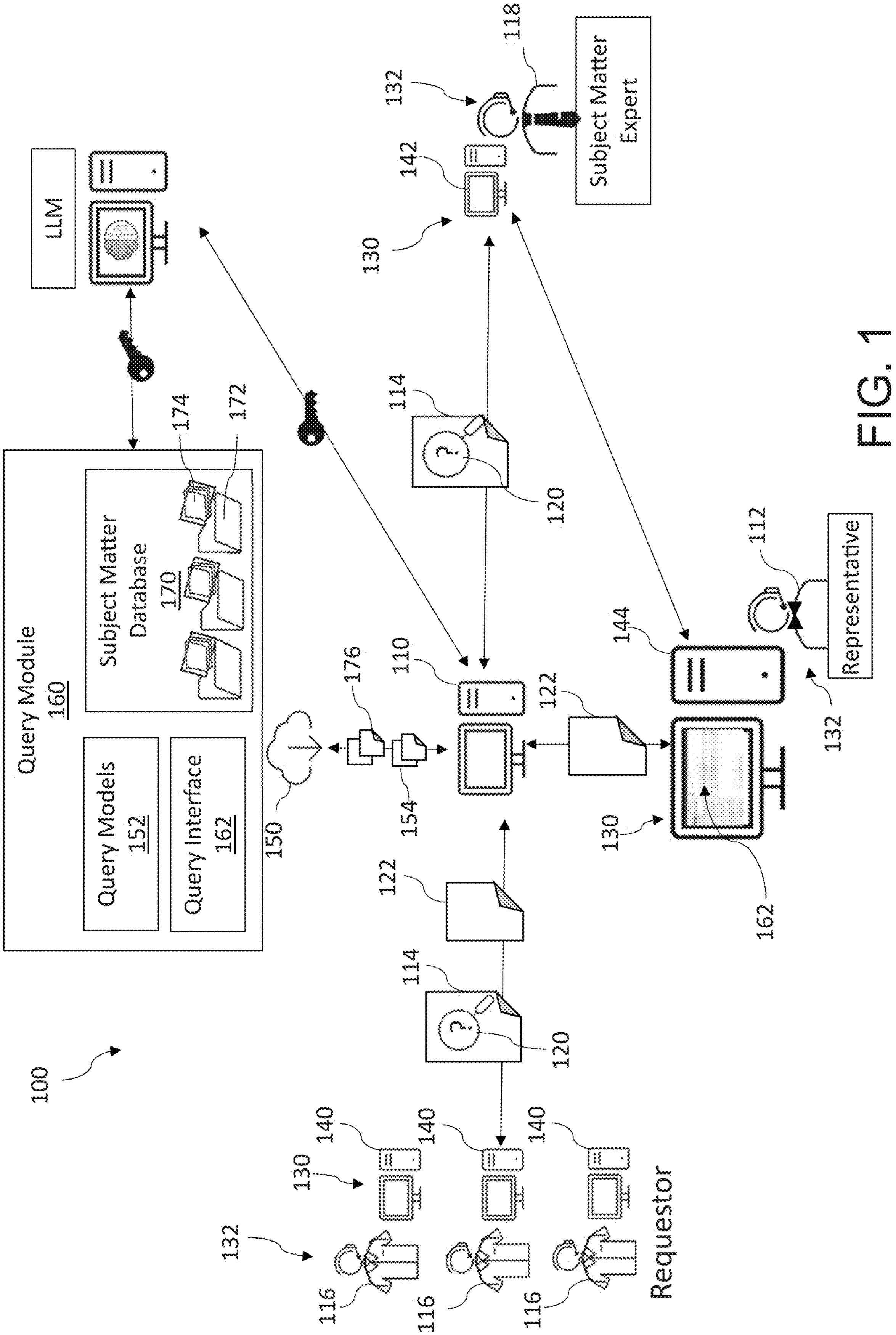
FIG. 1 is a schematic diagram of an exemplary AI-based query response system for interactions between one or more requestors, one or more associates, and one or more subject matter experts according to an exemplary embodiment of the present disclosure.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, computer systems and computer-implemented methods for assisting one or more associates, and if needed one or more subject matter experts, in generating a proposed response to an inbound message, received from one or more users, e.g., from a requestor. In some embodiments, the requestor may be an employee, subcontractor, representative, or agent that is interacting with one or more clients, such as insured users or potentially insured users. The computer systems and computer-implemented methods may include a screening process for evaluating inbound messages or determining query messages contained within the inbound message. The computer systems and computer-implemented methods may evaluate the inbound messages, and/or the identified query message, to identify a category database (a database or multiple databases that are structured by categories, subject matters, and/or topics) and one or more relevant documents contained within the category database that may be used to generate a proposed response to the query message. As discussed in greater detail below, the use of this category database improves the overall efficiency of the system by improving the speed in which responses are generated and returned to the requestor so that responses may be provided in real-time to the requestor.

The computer system and computer-implemented methods may also generate a document relevancy score for each of the identified relevant documents, serving as an indication of how useful and/or relevant the one or more identified relevant documents are in generating a proposed response to the query message. The computer system and computer-implemented methods may support a user friendly and intuitive user interface enabling an associate (or subject matter expert) to interact with the computer system and computer-implemented methods. For example, the user interface enables the associate to easily alternate between views each displaying different conversations with one or more of a plurality of different users or requestors. The interface may also display both the inbound messages and query messages derived from the inbound messages (e.g., side-by-side), enabling the associate to confirm, revise, and/or draft a new query message, as needed based on the associate's interpretation of the intended meaning or question associated with the inbound message. The interface may also display proposed response messages (e.g., before the response message is transmitted to user computing devices associated with the requestor), enabling the associate to review, revise, and/or rank response messages. For example, the user interface may provide one or more feedback buttons enabling the associate to provide feedback, e.g., positive, or negative, to the computer system and computer-implemented methods, to increase the accuracy of any subsequently determined query messages derived from inbound messages, as well as generated proposed responses. Feedback, provided by the representative, may include a response indicator (e.g., indicating if the representative agrees or disagrees with an AI model generated response message responsive to a query message derived from the inbound message), a revised or new proposed response message written by the representative or an expert, a relevancy score for one or more of the relevant documents. In some embodiments, feedback may include a question indicator associated with query message derived from the inbound message. For example, the representative may determine that the query message, derived from the inbound message should be revised or does not capture the intended question of the inbound message. In some embodiments, feedback may include a revised query messages generated by the representative.

In some embodiments, when the feedback is negative, e.g., a negative response indictor or a low relevancy score, the feedback may be applied as an input to the AI model to generate an output that includes an updated proposed response message that is responsive to the query messages. Subsequently, if the representative provide feedback that is still negative, the AI system may automatically identify a subject matter expert to assist in addressing the query message.

In embodiments described herein, feedback may be applied to the AI model to re-retrain, tune, or adjust the AI model, improving the accuracy of the AI model during subsequent application of the AI model, e.g., during the current conversation or during any subsequent conversations. The interface may also display one or more categories, one or more relevant documents, and/or a document relevancy score. The document relevancy score may be an indication of how relevant, useful, and/or how much information contained in the relevant document contributed to the determined proposed response message. The interface may also enable the associate to review the relevant documents, as well as their relevancy scores, while simultaneously (e.g., side-by-side), displaying the proposed response, the inbound message, and/or the query message. The interface may also enable the associate to assign a new document relevancy score, to increase the accuracy of subsequently generated proposed responses and the relevant documents that may be retrieved and/or used to generate the proposed responses.

Depending on a user assigned score of the proposed response, a user assigned score of the derived query message, and/or a user assigned score of the relevant documents, the computer system and/or the computer-implemented methods may include identifying one or more subject matter experts capable of participating in generating or authoring, a response to the inbound message, capable of revising or interpreting relevant documents, submitting new relevant documents, and/or deriving query messages from inbound messages. For example, if the computer systems and the computer-implemented methods determine that a score or indicator is too low (indicating low actual relevance or a negative response indicator), then a subject matter expert and associated expert computing device may be automatically identified for providing further support, such that the subject matter expert may be able to assist in generating a new proposed response to be provided to the requestor and/or identifying other documents that may be more relevant to the requestor's query, and/or modifying the located relevant documents including forwarding the located documents that are deemed to be of low relevance for the query to one or more authors of the document (or some other subject matter expert) for re-evaluation and re-categorizing with new labels so that these documents will be more properly located as part of future searches.

The computer systems and methods described herein may screen inbound messages, determine relevant documents, document relevancy scores, and generate proposed responses using one or more models trained using historical records and artificial intelligence techniques. The models may be associated with a Large Language Model (LLM). The computer systems and methods described herein simultaneously enable real persons (e.g., associates and experts), to participate in model outputs and inputs, enabling persons to provide additional information and evaluation of model outputs, in-real time during a conversation with a requestor, generally immediately after submission of a current inbound message, such that the model may be iteratively trained, re-trained or re-tuned, to improve the accuracy of the model outputs during audible and/or text based conversations. For example, the associate or expert, via the interface, may provide the model with the most up to date information and feedback.

At least one of the technical problems addressed by the AI-based response system described herein may include: (i) inability to determine a category of a query message to identify a subject-matter category database including documents associated with the subject-matter, and identify, one or more relevant documents contained within the database in real-time or near real-time during a conversation with person/requestor submitting a question; (ii) inability to generate a proposed response message, based on the relevant documents, in real-time or near real-time, during a conversation with a person/requestor submitting a query; and (iii) inability of known systems to identify a subject matter expert capable of assisting in generating proposed response messages and generating or authoring new or updating relevant documents that may be used to automatically generate proposed response messages, (iv) inability of a representative to assign a response indicator or provide feedback to proposed response message, (v) inability of a representative to assign a relevancy score to relevant documents, (vi) inability of a representative to review in-bound messages and proposed response messages, and (vii) inability of a representative to communicate with either, or both, experts and user submitting inbound messages.

A technical effect of the systems and processes described herein may be achieved by performing at least one of the following steps: a) causing to display, within a graphical user interface of a representative computing device, i) a proposed response message responsive to a query message derived from a current inbound message submitted by a user, the proposed response message being generated by an AI response model, ii) a link to one or more relevant documents retrieved from a corresponding subject-category database, and iii) a feedback input enabling a representative to assign a response indicator or feedback to the proposed response message, b) receiving, from the representative computing device, a response indicator for the proposed response message assigned by the representative via the feedback input, c) creating a historical record including the proposed response message and the response indicator, d) generating a training dataset including a plurality of historical records, e) using machine learning and/or artificial intelligence tools, re-training the AI response model using the training dataset, and f) in response to a request for a revised response message, causing to display, within the graphical user interface of the representative computing device, in real-time, a revised response message responsive to the current inbound message using the re-trained AI response model.

The technical effect achieved by this AI-based query response system may be at least one of: (i) enabling determining a category of a query message to identify a subject-matter category database including documents associated with the subject-matter, and identify, one or more relevant documents contained within the database in real-time or near real-time during a conversation with person/requestor submitting a question; (ii) enabling generating a proposed response message, based on the relevant documents, in real-time or near real-time, during a conversation with a person/requestor submitting a query; (iii) enabling of known systems to identify a subject matter expert capable of assisting in generating proposed response messages and generating new or updating relevant documents that may be used to automatically generate proposed response messages, (iv) enabling a representative to assign a response indicator to proposed response message, (v) enabling a representative to assign a relevancy score to relevant documents, (vi) enabling a representative to review in-bound messages and proposed response messages by displaying, side-by-side, inbound messages and proposed response messages, and (vii) enabling a representative to communicate with either, or both, experts and users submitting inbound messages.

At least one of the technical problems addressed by the AI-based response system described herein may include: (i) inability of an associate or subject matter expert to review a plurality of documents in real-time or near real-time to determine a relevant document or documents during a conversation with person/requestor submitting a question; (ii) inability of known systems to identify a subject matter expert capable of assisting in generating proposed response messages and generating new or updating relevant documents that may be used to automatically generate proposed response messages; (iii) inability to adjust a document relevancy score of a relevant document and/or a proposed response message, in real-time or near real-time, in order to provide feedback to an AI model, such that the model may generate more accurate response messages on subsequently applied query messages; and (iv) inability to provide real-time feedback on proposed response messages, and identification of a subject matter expert based on the feedback of the proposed response message.

A technical effect of the systems and processes described herein may be achieved by performing at least one of the following steps: a) transmit, to a representative computing device, an AI model generated proposed response message responsive to a query message derived from the inbound message, b) receive, from the representative computing device, feedback associated with the AI model generated proposed response message, the feedback provided by a representative, c) create a historical record including the AI model generated proposed response message and the feedback, d) generate a training dataset including at least the created historical record, and e) using machine learning and/or artificial intelligence techniques, re-train the AI model using the training dataset.

The technical effect achieved by this AI-based query response system may be at least one of: (i) enabling an associate or subject matter expert to review a plurality of documents in real-time or near real-time to determine a relevant document or documents during a conversation with person/requestor submitting a question; (ii) enabling identification of a subject matter expert capable of assisting in generating proposed response messages and generating new or updating relevant documents that may be used to automatically generate proposed response messages; (iii) enabling an associate or expert to adjust a document relevancy score of a relevant document and/or a proposed response message, in real-time or near real-time, in order to provide feedback to an AI model, such that the model may generate more accurate response messages on subsequently applied query messages; and (iv) enabling an associate and/or an expert to provide real-time feedback on proposed response messages, and identification of a subject matter expert based on the feedback of the proposed response message.

At least one of the technical problems addressed by the AI-based response system described herein may include: (i) inability to determine a category of a query message to identify a subject-matter category database including documents associated with the subject-matter, and identify, one or more relevant documents contained within the database in real-time or near real-time during a conversation with person/requestor submitting a question; (ii) inability to generate a proposed response message, based on the relevant documents, in real-time or near real-time, during a conversation with a person/requestor submitting a query; and (iii) inability of known systems to identify a subject matter expert capable of assisting in generating proposed response messages and generating new or updating relevant documents that may be used to automatically generate proposed response messages.

A technical effect of the systems and processes described herein may be achieved by performing at least one of the following steps: (a) receive an inbound message from a requestor computing device, b) parse the inbound message to generate a query, c) determine one or more keywords contained within the query, d) identify, based in part on the keywords, a subject-matter category database from the plurality of subject-matter category databases that is responsive to the one or more keywords, e) search the identified subject-matter category database to determine one or more relevant documents, wherein the one or more relevant documents include information responsive to the query, f) input the determined one or more relevant documents into a generative AI model to generate one or more model outputs including a proposed response message responding to the inbound message and a relevancy score for each of the relevant documents, the relevancy score indicating a level of relevance and responsiveness of the document to the inbound message, and g) transmit a notification message to a representative computing device, wherein the notification message includes one or more of the following: i) the proposed response message, ii) a selectable link associated with the determined one or more relevant documents, and iii) the relevancy score for each of the one or more relevant documents.

The technical effect achieved by this AI-based query response system may be at least one of: (i) enabling determining a category of a query message to identify a subject-matter category database including documents associated with the subject-matter, and identify, one or more relevant documents contained within the database in real-time or near real-time during a conversation with person/requestor submitting a question; (ii) enabling generating a proposed response message, based on the relevant documents, in real-time or near real-time, during a conversation with a person/requestor submitting a query; and (iii) enabling of known systems to identify a subject matter expert capable of assisting in generating proposed response messages and generating new or updating relevant documents that may be used to automatically generate proposed response messages.

In embodiments described herein, the requestor, and associated computing device, may refer to any person or persons that transmits an inbound message. For example, the requestor is a person submitting a question, query, or request for information to the AI-based query response system described herein. In some cases, the requestor may be an employee of the business, an agent of the business, or an outside party. The requestor may be an agent that is interacting with a client, such as an insured party or a potentially insured party, and the requestor is requesting information that the requestor may subsequently provide to the client. In certain embodiments, the requestor may be a client who may submit inbound messages. Further, the systems and methods described herein may receive, or retrieve, an inbound message from the requestor computing device though various sources. For example, the inbound message may be submitted though a requestor interface associated with a website or application executable on a computing device, or additionally or alternatively, inbound messages may be retrieved from various social media sites (e.g., a requestor may post an inbound message on Twitter, Facebook, Instagram, Snapchat, and/or TikTok). The computer system and computer-implemented method described herein may monitor the various sources to obtain inbound messages.

As described herein, an associate may generally refer to a person who is tasked with responding to questions or queries on various subject matters, by reviewing, revising, or scoring response messages determined by the AI-based query response system. In the embodiments described herein, the associate may generally refer to any person who is using the AI-based query response system for screening, evaluating, and responding to inbound messages. In certain cases, (e.g., when/if a proposed response message is scored low and/or indicated to be insufficient or not responsive by the associate) a subject matter expert may be identified and recruited to assist in generating a response message. In certain embodiments, subject matter experts may interact directly with the AI-based query response system, such that the associates may or may not be referred to as experts. In certain embodiments, the associates act as a liaison between requestors and the subject matter experts. The associate may be associated with an employee that is tasked with conducting research (e.g., evaluating subject-category databases and documents contained within the subject-category databases) in order to evaluate proposed responses. In embodiments described herein, the subject matter expert may be an employee that has knowledge or skills in a certain category or field and may be tasked with generating the documents to be saved in the subject-category databases.

Exemplary Query Response Computing System

FIG. 1 depicts a simplified schematic diagram of a AI-based query response system 100 including a query response computing device 110 for supporting an representative 112 (also referred to herein as an agent, an associate, and/or a user) in fielding, evaluating, and responding (e.g., generally referred to herein as process or processing) to one or more inbound messages 114 retrieved, or received, from a requestor 116 (also referred to as a user, an agent, and/or any a person or persons submitting the inbound message 114) and, if necessary, identify and elicit the assistance of one or more subject matter experts 118 to participate in processing (e.g., responding and/or addressing), the inbound message 114. The inbound message 114, received from the requestor 116, may be first pre-processed by the AI-based query response system 100, in order to parse, identify, and interpret the inbound message 114 to determine one or more query messages 120. The AI-based query response system 100 may generate one or more proposed response messages 122 (e.g., an outbound message) addressing or answering the query messages 120, which may be transmitted back to the requestor 116. The proposed response messages 122 may be reviewed or revised by the representative 112 prior to the AI-based query response system 100 transmitting the response message back to the requestor 116.

The query response computing device 110 is communicatively coupled to one or more user computing devices 130 associated with one or more users 132 (e.g., the associate, agent, or representative 112, the requestor 116, and/or the expert 118) participating with the AI-based query response system 100. For example, the query response computing device 110 may be communicatively coupled to a requestor computing device 140 associated with the requestor 116, an expert computing device 142 associated with the expert 118, and a representative computing device 144 associated with the representative 112. The query response computing device 110 may also be communicatively coupled to a database 150 (e.g., a cloud-based database) that may store one or more historical records 154. Each historical record is associated with a historic event, for example, each historical record may include at least one of a historical inbound message 114, one or more historical query messages 120 derived with the historical inbound message 114, historical response messages 122 addressing or answering the historical query messages 120, a determined category associated with a category of one or more historical query messages 120 and/or relevant documents 176. The historical records 154 may contain additional or alternative historical data and/or the historical records 154 may be updated or modified based on newly collected data, as will be described in further detail below.

The AI-based query response system 100 further includes a query response module 160 that may be associated with, or in communication with, the query response computing device 110. The query response module 160 may support a query response interface 162 that enables the representative 112 and/or the expert 118 to review relevant documents 176, proposed response messages 122, organize and view inbound messages 114 from a plurality of different user computing devices, communicate with expert computing devices 142 associated with experts 118, rank, score, or assign an indication to the proposed response messages 122 and relevant documents 176, and/or communicate with various other components of the AI-based query response system 100. The query response interface 162 is described in greater detail with respect to FIG. 5.

The AI-based query response system 100 may automatically, and in-real time, process a current inbound messages 114 or perform one or more tasks to support the representative 112 in processing the inbound message 114. Automatically may refer to one or more processing steps that may be triggered to be executed by one or more events, e.g., upon receiving of an inbound message 114. In real-time may refer to the AI-based query response system 100 and/or the module 160 processing the inbound message 114 immediately upon receiving, or retrieving, the inbound message 114 and transmitting to a user computing device, a response message upon generation and/or approval of, the response message 122.

The query response computing device 110 and/or query response module 160 may also be communicatively coupled to a subject matter database 170, e.g., stored within a cloud-based database 150 communicatively coupled to the query response computing device 110. The subject matter database 170 includes one or more individual subject-category databases 172. Each one of the individual subject-category databases 172 may contain one or more documents 174 that pertain to the particular category of the category database 172, such that each of the individual subject-category databases 172 have reduced memory size, as compared to the subject matter database 170 (e.g., the subject matter database 170 as a whole containing more than one of the individual subject-category databases 172). For example, the individual subject-category databases 172 may only contain documents 174 associated with the category and additional, alternative, and/or outdated document may be omitted from the category database 172.

Upon receiving an inbound message 114 or query message 120, the module may utilize (e.g., evaluate, sort, parse, or identify) one or more documents 174 contained within the subject-category databases 172 to identify one or more relevant documents 176 (e.g., a subset of all the document 174 contained within the category database 172) that may be used to process inbound messages 114. The reduced data size and focused nature of the individual subject-category databases 172 reduces computational loads and times required by the module 160 and/or the query response computing device 110, particularly, to reduce processing times for processing the inbound message 114 during real-time communications with requestors 116. Furthermore, the focused nature of the individual subject-category databases 172, in addition to the module 160 periodically updating one or more documents contained in the category database 172, is such that the subject-category databases 172 each include the most relevant and up to date information enabling the AI-based query response system 100 to generate accurate and articulate proposed response messages 122 in a timely manner. The categories of the individual subject-category databases 172 may include, for example and without limitation, billing, banking, investments, claims, policy quotes or coverage, and/or insurance types (e.g., life, auto, liability, health, medical, etc.). In alternative embodiments, additional or alternative categories may be included.

The query response module 160 further includes one or more query response models 152, (e.g., a machine learning or artificial intelligence-based (AI) models, referred to herein as an AI model), that may be trained using historical records 154, the subject matter database 170, one or more of the individual subject-category databases 172, and/or one or more documents 174 contained within the one or more individual subject-category databases 172. One or more inputs may be applied to the query response model 152 and the query response model 152 may generate one or more outputs. For example, the query response model 152 may be used to generate one or more outputs including proposed response messages 122, one or more query messages 120 (e.g., derived from the inbound message 114), one or more determined categories associated with the one or more query messages 120, one or more determined relevant documents 176 (e.g., contained within a subject matter database 170 associated with the determined category), a document relevancy score for each of the one of more determined relevant documents 176. The document relevancy score may be associated with how relevant or useful (e.g., number of keywords, keyword linear proximity, etc.) that the document pertains or relates to the query message 120. The relevancy score may indicate a level of relevance and responsiveness of the document to the inbound message 114 or query message 120. In some embodiments, the query response model 152 generates one or more outputs including one or more query keywords in association with the query message 120. In some embodiments, the document relevancy score may be determined, at least in part, using on a linear distance between the query keywords, parsed from the inbound message 114 or the query message 120, that are contained within the relevant document 176. The query response model 152 may be trained to generate additional and/or alternative model outputs, when one or more model inputs are applied. For example, the query response model 152 may be trained to receive one or more model inputs including, for example, an inbound message 114. The inbound message 114 may be applied to the query response model 152, in real-time (e.g., immediately, 1-2 ms, upon the AI-based query response system 100 retrieving, or receiving, the inbound message 114). In some embodiments, the query message 120 (e.g., derived from the inbound message 114) may be applied as an input to the query response model 152.

In various embodiments, the query response module 160 may include a plurality of different individual and/or separate query response models 152. In certain embodiments, each individual query response model 152 may be trained using a different training dataset. In certain embodiments, one or more of the query response models 152 may be associated with a large language model (LLM). In some embodiments, the query response module 160 and/or the query response computing device 110 may be communicatively coupled to one or more LLMs. The query response module 160 may transmit model inputs, one or more subject-category databases 172, and/or training data (e.g., historical records 154) to the LLM and the LLM may generate one or more model outputs which are retrieved or received by the query response module 160.

In certain embodiments, the query response models 152 may include a response model, for generating a proposed response to a query message 120, a query model, for generating or determining the query message 120 from the inbound message 114, generating a return message (e.g., requesting clarification of the intended meaning of the inbound message 114), determining or identifying one or more keywords, determining one or more subject matter categories associated with the query message 120. In certain embodiments, the query response model 152 may include a category model for determining a category of the query message 120 and/or the inbound message 114, identifying a category database 172, identifying one or more relevant documents 176 contained within the identified category database 172, and/or a document relevancy score for each of the identified relevant documents 176. The category model may also identify one or more subject matter experts 118 computing devices associated with one or more subject matter experts 118 associated with the identified category.

The AI-based query response system 100 may build one or more training datasets for training, retraining, tuning, and/or updating the query response models 152. Building the training datasets may include generating and/or storing within the database, historical records 154. As mentioned above, the individual models may each be trained using separate or different training datasets (e.g., having different historical records 154 and/or different data contained within the historical records 154). For example, the response model may be trained using a training dataset including a plurality of historical records 154 including historical query messages 120 and historical response messages 122 responsive to the historical query messages 120 (e.g., generated by the model), a response indicator (e.g., assigned by the representative 112 or the expert 118, or a score or indicator previously assigned by the system and/or the model), a revised or updated response message (e.g., as prepared by the representative 112 and/or an expert 118), a comparison of the response message and the revised response message, and/or any other suitable feedback provided by the representative 112 or the expert 118. In some embodiments, the AI-based query response system 100 may compare an updated response message to the originally proposed response message to automatically determine a responsiveness score of the proposed response message. Then, using machine learning and/or artificial intelligence techniques, the AI-based query response system 100 may re-train the AI model using a learning dataset including one or more of the following: the proposed response message, the responsiveness score of the proposed response message, and the updated response message.

The query response models 152 may be trained, re-trained, re-tuned and/or updated periodically using one or more updated or new historical records 154. The query response model 152 may also be re-trained or retuned based on feedback provided by one or more of the users 132 (e.g., the representative 112 and/or the subject matter experts 118). For example, the query response model 152 may determine an initial document relevancy score for each of the relevant documents 176, and subsequently, the score and the relevant documents 176 may be reviewed by the representative 112 who may assign a new or updated score. This new score and/or the comparison to the previous score may be used in the training dataset.

The computing device may determine if the feedback, e.g., the document relevancy score, the updated document relevancy score, the response indicator, and/or the update response indicator satisfies one or more criteria. For example, the computing device may compare the document relevancy score to the updated document relevancy score and if the difference between the two scores exceeds a threshold, the computing device may be triggered to perform one or more additional action, e.g., update one or more historical records 154 and retrain or retune the query response model 152 using the updated historical records 154. If the difference between the two scores exceeds a threshold, the computing device may be triggered to identify a subject matter expert 118 who may be able to assist in identifying relevant documents 176.

In some embodiments, the query response module 160 may pre-process or screen inbound messages 114, e.g., prior to the query response module 160 generating a proposed response and/or prior to the query response module 160 identifying a category for the category database 172. During pre-processing, the query response module 160 may initially determine if the inbound message 114 contains one or more query messages 120. Determining may include parsing the inbound message 114 to identify one or more query messages 120. In some embodiments, determining may include interpreting the inbound message 114 to determine the one or more query messages 120. In some embodiments, the query response module 160 may determine that the inbound message 114 does not contain enough information to determine one or more query messages 120 and the AI-based query response system 100 may generate one or more follow up or response messages 122 (e.g., an outbound message) to be transmitted back to the requestor computing device 140 that prompt the requestor 116 to provide additional information or to confirm or deny a proposed query message 120. In some cases, the pre-processing may also include assigning a flag or identifier to an inbound message 114.

Exemplary Computing Network

Figure 2:
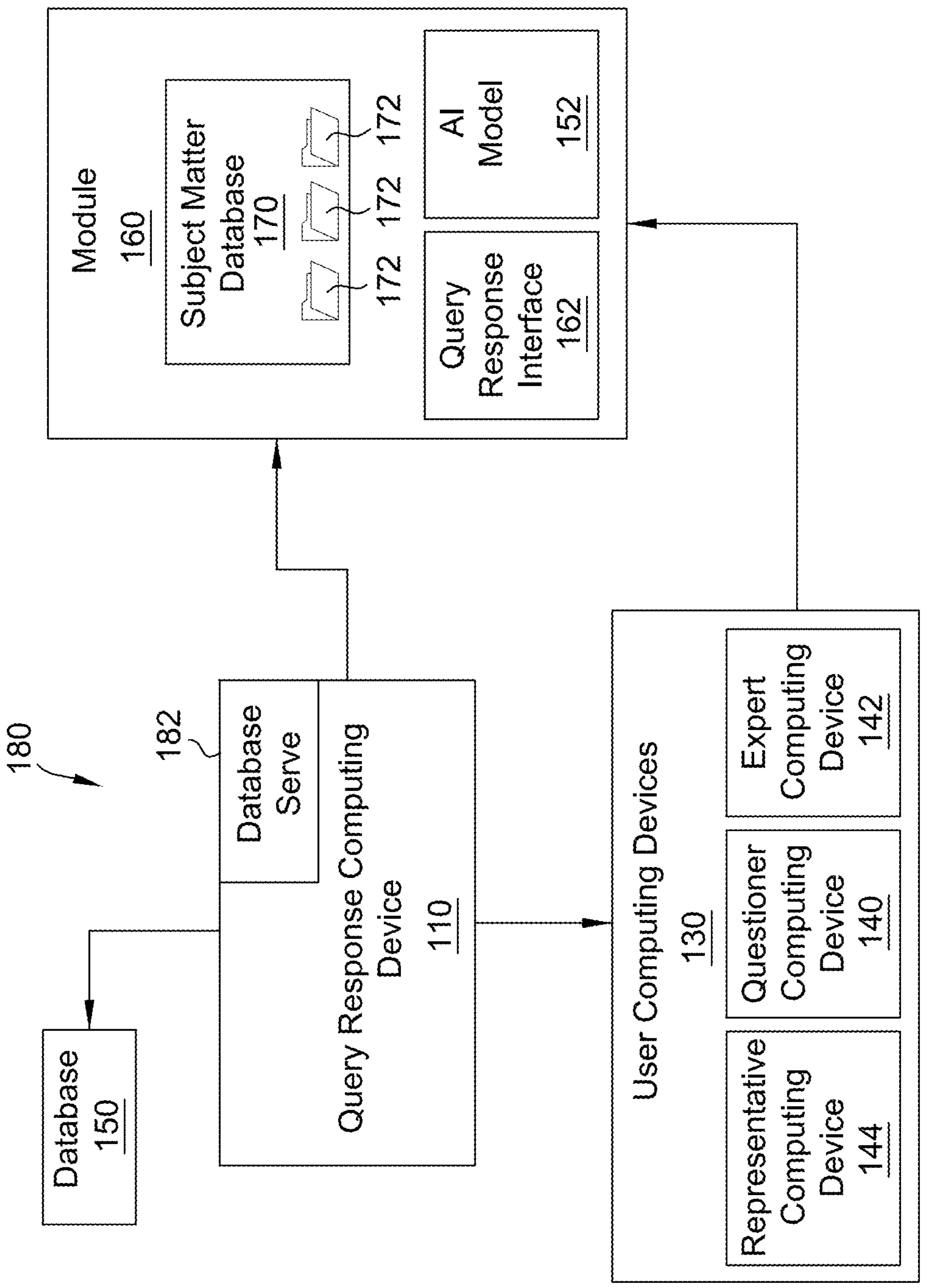
FIG. 2 is a simplified block diagram of an exemplary computing system for use with the exemplary AI-based query response system shown in FIG. 1.

FIG. 2 depicts a simplified block diagram of the exemplary query response computing system 180 for use with the AI-based query response system 100, shown in FIG. 1. The query response computing system 180 includes the query response computing device 110 and supports interactions between one or more user computing devices 130 (e.g., a representative computing device 144), a requestor computing device 140, and/or an expert computing device 142. For example, the query resp representative 112 in fielding, evaluating, and responding (e.g., generally referred to herein as process or processing) to one or more inbound messages 114 retrieved, or received, from a requestor 116 (a person or persons submitting the inbound message 114) and, if necessary, identify and elicit the assistance of one or more subject matter experts 118 to participate in processing, e.g., responding and/or addressing, the inbound message 114.

In the exemplary embodiment, user computing devices 130 are computing devices that include a web browser or a software application, which enables user computing devices 130 to communicate with the query response computing system 180 using the Internet. More specifically, user computing devices 130 are communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. User computing devices 130 may include the user computing device 130 and/or interface of user computing device, described herein.

User computing devices 130 may be any device capable of accessing the Internet including, but not limited to, a mobile device, a desktop computing, a laptop computing, a personal digital assistant (PDA), a cellular phone, a smartphone, a tablet, a phablet, wearable electronics, smart watch, virtual headsets or glasses (e.g., AR (augmented reality), VR (virtual reality), or XR (extended reality) headsets or glasses), smart glasses, a kiosk, chat bots, or other web-based connectable equipment or mobile devices. In alternative embodiments, user computing devices 130 are capable of accessing query response computing system 180, such as through interface 162.

A database server 182 may be communicatively coupled to a database 150 that stores data. In one embodiment, database 150 may include scan files, subject-category databases 172, documents 174, user 132 information, and/or user 132 preferences. In the exemplary embodiment, database 150 may be stored remotely from query response computing system 180. Additionally, or alternatively, database 150 may be decentralized. In the exemplary embodiment, users 132 may access database 150 via user computing devices 130 by logging onto the system 180, e.g., by transmitting communication message to the query response computing system 180, as described herein.

Exemplary Client Device

Figure 3:
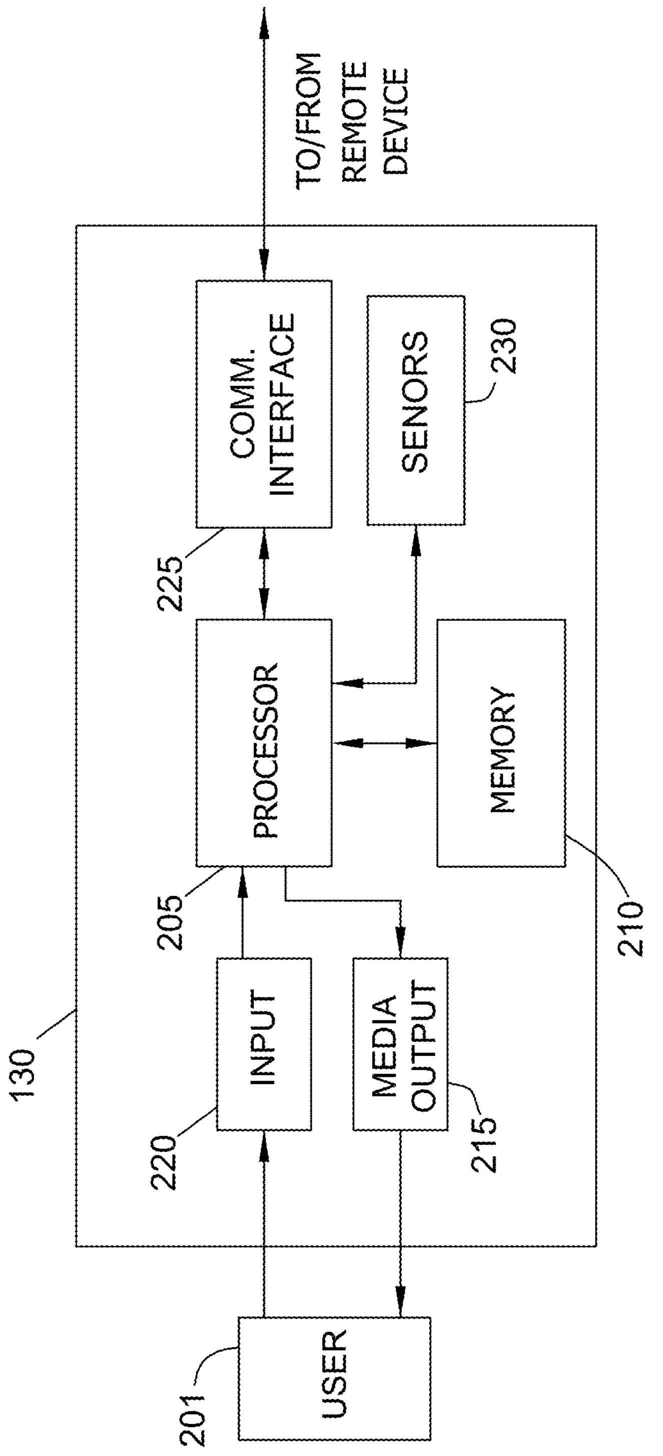
FIG. 3 is an exemplary configuration of a user computing device according to an exemplary embodiment of the present disclosure for use with the AI-based query response system described herein.

FIG. 3 depicts an exemplary configuration of a user computing device 130 shown in FIG. 1, in accordance with one embodiment of the present disclosure. User computing device 130 may be operated by a user 201. User computing device 130 may include a processor 205 for executing instructions. In some embodiments, executable instructions are stored in a memory area 210. Processor 205 may include one or more processing units (e.g., in a multi-core configuration). Memory area 210 may be any device allowing information such as executable instructions and/or transaction data to be stored and retrieved. Memory area 210 may include one or more computing readable media.

User computing device 130 may also include at least one media output component 215 for presenting information to user 201. Media output component 215 may be any component capable of conveying information to user 201. In some embodiments, media output component 215 may include an output adapter (not shown) such as a video adapter and/or an audio adapter. An output adapter may be operatively coupled to processor 205 and operatively couplable to an output device such as a display device (e.g., a cathode ray tube (CRT), liquid crystal display (LCD), light emitting diode (LED) display, or "electronic ink" display), an audio output device (e.g., a speaker or headphones), virtual headsets (e.g., AR (Augmented Reality), VR (Virtual Reality), or XR (extended Reality) headsets).

In some embodiments, media output component 215 may be configured to present or display within a graphical user interface (e.g., a web browser and/or a client application) to user 201. A graphical user interface may include, for example, an online store interface for viewing and/or purchasing items, and/or a wallet application for managing payment information. In some embodiments, user computing device 130 may include an input device 220 for receiving input from user 201. User 201 may use input device 220 to, without limitation, select and/or enter one or more items to purchase and/or a purchase request, or to access credential information, and/or payment information.

Input device 220 may include, for example, a keyboard, a pointing device, a mouse, a stylus, a touch sensitive panel (e.g., a touch pad or a touch screen), a gyroscope, an accelerometer, a position detector, a biometric input device, an audio input device (e.g., a microphone), and/or a video input device (e.g., a camera). A single component such as a touch screen may function as both an output device of media output component 215 and input device 220.

User computing device 130 may also include a communication interface 225, communicatively coupled to a remote device such as query response computing system 110 (shown in FIG. 1). Communication interface 225 may include, for example, a wired or wireless network adapter and/or a wireless data transceiver for use with a mobile telecommunications network.

Stored in memory area 210 are, for example, computing readable instructions for providing a user interface to user 201 via media output component 215 and, optionally, receiving and processing input from input device 220. A user interface may include, among other possibilities, a web browser and/or a client application. Web browsers enable users, such as user 132, to display and interact with media and other information typically embedded on a web page or a website from the query response computing system 110 and/or the query module 160. A client application allows user 201 to interact with, for example, the query response computing system 110 and/or the query module 160. For example, instructions may be stored by a cloud service, and the output of the execution of the instructions sent to the media output component 215.

Processor 205 executes computing-executable instructions for implementing aspects of the disclosure. In some embodiments, the processor 205 is transformed into a special purpose microprocessor by executing computing-executable instructions or by otherwise being programmed.

Exemplary Server Device

Figure 4:
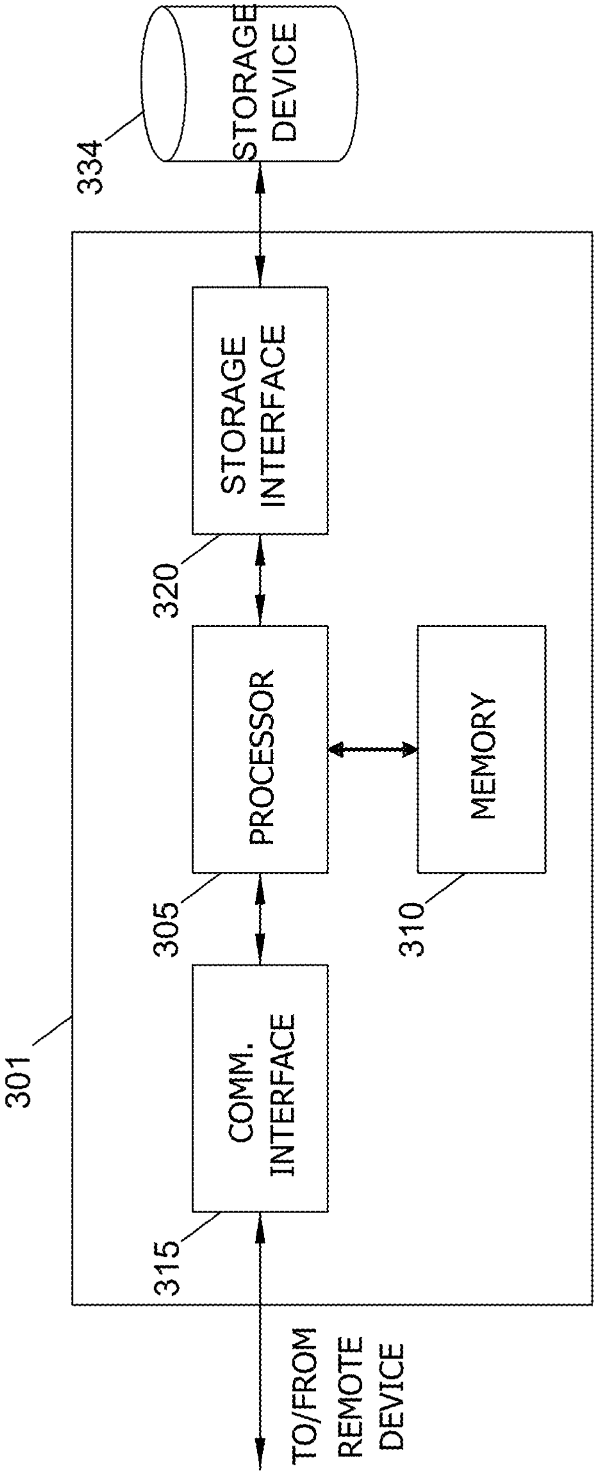
FIG. 4 is an exemplary configuration of a server computing device according to an exemplary embodiment of the present disclosure for use with the AI-based query response system described herein.

FIG. 4 depicts an exemplary configuration of a server computing device 301 (e.g., query response computing device 110 or an AI-based computing system), in accordance with one embodiment of the present disclosure. Server computing device 301 may include, but is not limited to, query response computing system 110 and/or query module 160 (all shown in FIG. 1). Server computing device 301 may also include a processor 305 for executing instructions. Instructions may be stored in a memory area 310. Processor 305 may include one or more processing units (e.g., in a multi-core configuration).

Processor 305 may be operatively coupled to a communication interface 315 such that server computing device 301 is capable of communicating with a remote device such as another server computing device 301, query module 160, or user computing devices 130 (shown in FIGS. 1 and 2). For example, communication interface 315 may receive requests from user computing devices 130 via the Internet.

Processor 305 may also be operatively coupled to a storage device 334. Storage device 334 may be any computing-operated hardware suitable for storing and/or retrieving data, such as, but not limited to, data associated with database 150 (shown in FIG. 1). In some embodiments, storage device 334 may be integrated in server computing device 301. For example, server computing device 301 may include one or more hard disk drives as storage device 334.

In other embodiments, storage device 334 may be external to server computing device 301 and may be accessed by a plurality of server computing devices 301. For example, storage device 334 may include a storage area network (SAN), a network attached storage (NAS) system, and/or multiple storage units such as hard disks and/or solid state disks in a redundant array of inexpensive disks (RAID) configuration.

In some embodiments, processor 305 may be operatively coupled to storage device 334 via a storage interface 320. Storage interface 320 may be any component capable of providing processor 305 with access to storage device 334. Storage interface 320 may include, for example, an Advanced Technology Attachment (ATA) adapter, a Serial ATA (SATA) adapter, a Small Computing System Interface (SCSI) adapter, a RAID controller, a SAN adapter, a network adapter, and/or any component providing processor 305 with access to storage device 334.

Processor 305 may execute computing-executable instructions for implementing aspects of the disclosure. In some embodiments, the processor 305 may be transformed into a special purpose microprocessor by executing computing-executable instructions or by otherwise being programmed.

Exemplary Query Response Interfaces

Figure 5:
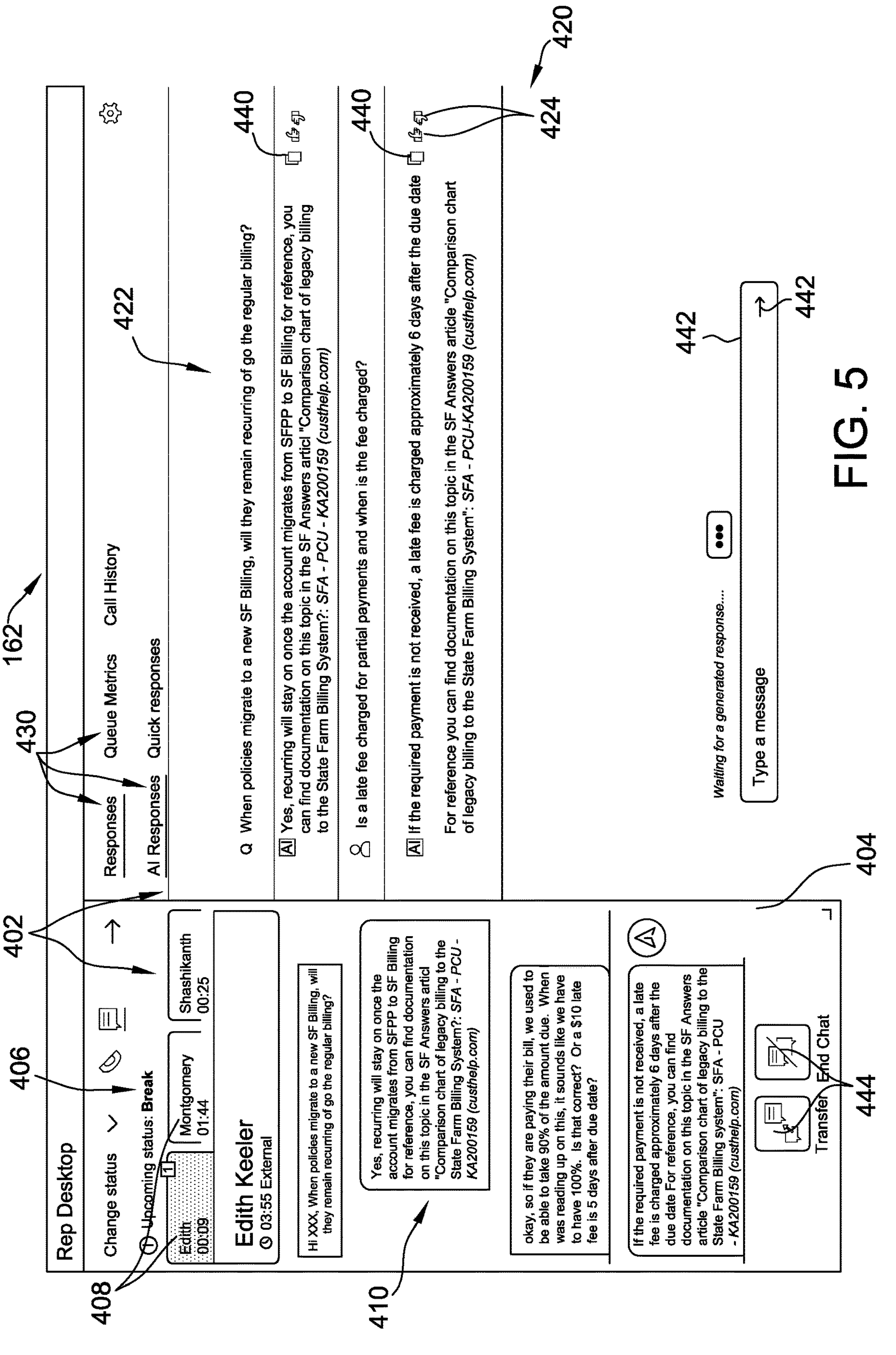
FIG. 5 is an exemplary query response interface for use with the exemplary AI-based query response computing system shown in FIG. 1.

FIG. 5 depicts an exemplary query response interface 162 enabling one or more uses (e.g., the representative 112 and/or the expert 118), to interact with the AI-based query response system 100. The query response interface 162 includes one or more panels 402 to categories information and maintain separate and distinct areas, e.g., defined by boundary lines 404, which organize information in an intuitive manner. For example, the interface 162 may include a conversation panel 406 (also referred to herein as a chat panel 406) including one or more tabs or buttons 408 (e.g., virtual buttons or tabs) enabling a user to alternative between displaying any one of one or more conversations 410 (e.g., inbound message 114 and proposed response messages 122) with requestors 116 (e.g., Edith or Shashikanth). The conversation tab button 408 maintains a visual separation between various conversations 410 with different requestors 116.

The interface 162 may also include an interaction panel 420 positioned adjacent to the conversation panel 406. The interaction panel 420 may be associated with a conversation 410 and selecting a conversation tab button 408 may automatically cause the interaction panel 420 to be updated or populated with information 422 and/or interactive buttons 424 (also referred to herein as feedback inputs 424) and/or additional or alternative features as related to the conversation. In some embodiments, the feedback inputs 424 includes a data field for inputting a relevancy score assigned to each of the one or more relevant documents, for inputting revised response messages, and/or inputting a response indicator (e.g., a negative response indicator or a positive response indicator). The relevant documents may be accessed via a selectable link 440, e.g., having an intuitive shape or appearance similar to a paper or stack of papers.

The interaction panel 420 may display information received from AI-based query response system 100, such as, at least one of the inbound message 114, query message 120, proposed response messages 122 or inbound message 114, one or more relevant documents 176 (e.g., relevant documents 176 retrieved from the identified or corresponding subject-category databases 172), and/or a document relevancy score for each of the relevant documents 176.

The interaction panel 420 may display the query message 120 and the inbound message 114, enabling the user to compare the two messages, e.g., to confirm and/or revise the query message 120. In certain embodiments, the interaction panel 420 may provide interactive buttons 424 that enable the user to provide feedback, such as assign a score, assigned an indicator, revise, and/or reject the query message 120 and/or draft a new query message 120. In some embodiment, the interaction panel 420 may display response messages 122 enabling user to assign a score, assigned an indicator, revise, and/or reject the proposed response message 122. In certain embodiments, the interaction panel 420 may provide one or more interactive buttons 424 that enable a user to assign a score, assigned an indicator, revise, and/or reject the query message 120, and/or draft a new response message 122. In certain embodiments, the interaction panel 420 may provide one or more interactive buttons 424 that enable a user to provide feedback regarding the query message 120. The interaction panel 420 enables a user to provide any suitable feedback to the AI computing system to improve the accuracy of the AI model in real-time such that the AI-model generates more responsive and accurate proposed response messages to query messages, e.g., during a current conversation or during subsequent conversations.

The interaction panel 420 may display a category and/or an associated category database 172, one or more relevant documents 176, and/or one or more document relevancy scores for each of the one or more relevant documents 176. In certain embodiments, the interaction panel 420 provides one or more interactive buttons 424 that enable a user to score, revise, reject the relevant documents 176 or categories, and/or to determine new relevant documents 176.

In embodiments described herein, the one or more user interactive buttons 424 (e.g., also referred to herein as feedback inputs) may be embodied as icons having intuitive shapes (e.g., a thumbs up icon for selecting a positive indicator or approval indication of the proposed response message 122 and/or a thumbs down icon for selecting a negative, disapproval, or negative indication of a proposed response message 122). The one or more interactive buttons 424 enable a user to transmit and receive information with the AI-based query response system 100. The one or more interactive buttons 424 also enable the user to provide feedback regarding model outputs in real time such that the model may be updated and re-trained to improve the accuracy of model outputs for subsequently received inbound messages 114 or applied query message 120.

The interaction panel 420 may also display an identified subject expert 118 and associated expert computing device 142, associated with the identified category. In some embodiments, the interaction panel 420 enables communications (e.g., transmitting and receiving messages) with the expert computing device 142. In certain embodiments, the interaction panel 420 includes one or more interactive buttons 424 that may be selected by the representative 112 causing one or more messages to be transmitted to the expert computing device 142. For example, one or more interactive buttons 424, e.g., a message transfer input, may be selected causing the system to transmit an outbound message to the expert computing device 142 including at least one or more of the inbound messages 114, the query message 120, the proposed response message 120, the relevant documents 176, the document relevancy score, etc.

In certain embodiments, the interaction panel 420 includes one or more activity tabs 430, enabling a user to adjust the display of the interaction panel 420. In the illustrated embodiment, the activity tabs 430 include one or more of the following: a response tab, a queue metrics tab, a call history tab, AI responses, and quick response.

In certain embodiments, one or more objects (e.g., messages, documents, etc.) may be readily transferred between the interaction panel 420 and conversation panel 406. For example, a proposed response message 122, displayed for review on the interaction panel 420, may be populated as a message in the conversation panel 406. For example, a user may copy and paste a reviewed proposed response message 122 and paste the message in a message box contained within the conversation panel 406. Alternatively, one or more user inputs may be selected to automatically populate the proposed response message 122 in the conversation panel 406. In some embodiments, the interaction panel 420 includes a text box 442 that may be populated with an AI generated proposed response message, enabling the representative 112 to edit or revise the AI generated proposed response message, before selecting a transfer button 444 to transfer or send the proposed response message to a requestor 116.

Exemplary Query Response Data Flow

Figure 6:
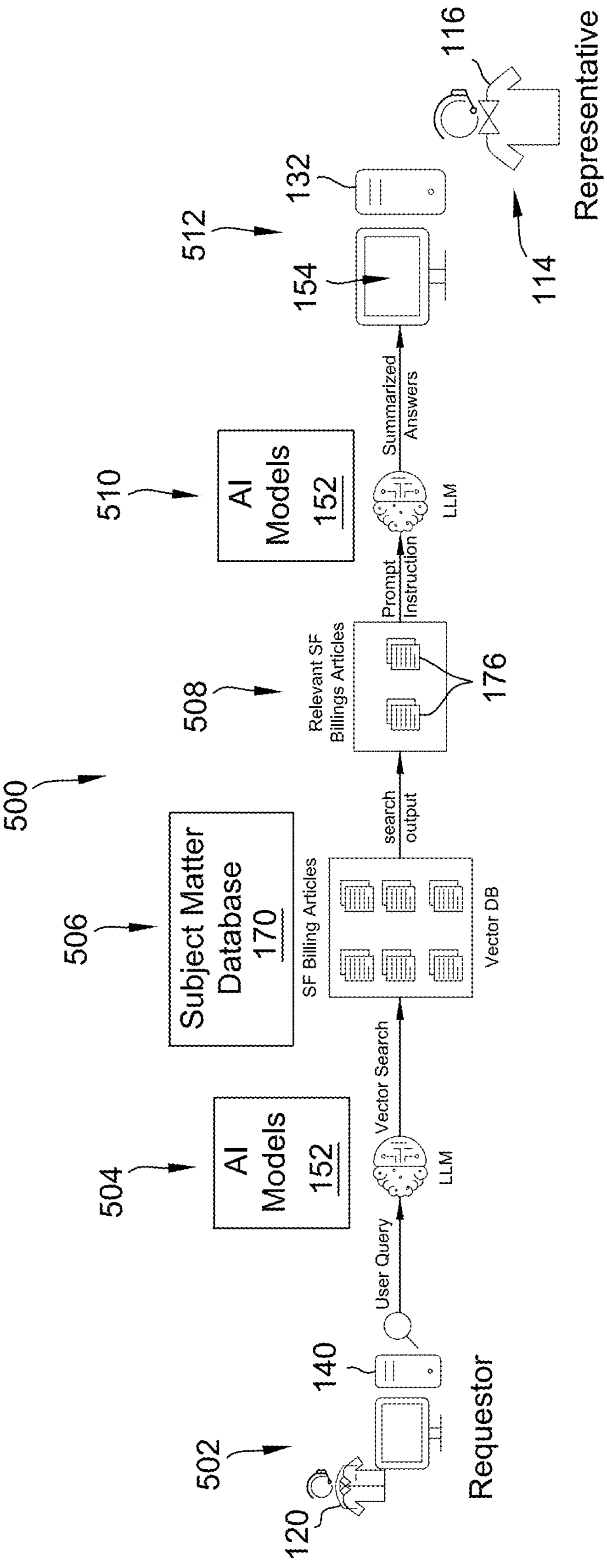
FIG. 6 is an exemplary data flow chart illustrating an exemplary data flow implemented by the AI-based query response computing system shown in FIG. 1.

FIG. 6 depicts an exemplary data flow process 500 for use with the AI-based query response system 100 shown in FIG. 1. The data flow process 500 includes of one or more requestors 116 transmitting 502 an inbound message 114 via the requestor computing device 140, to the AI-based query response system 100. The inbound message 114 may be applied 504 to an artificial intelligence query response model 152 (e.g., an LLM), to generate one or model outputs including a query message 120, determining 506 a category database 172, and/or determining 508 one or more relevant documents 176, and associated one or more document relevancy scores. The relevant documents 176 and the query message 120 may be applied 510 to an artificial intelligence query response model 152 (e.g., an LLM), to generate one or more model outputs including generating 512 a proposed response message 122. In some embodiments, all documents contained within the identified category database 172 may be applied to the artificial intelligence query response model 152 to generate one or more model outputs including the proposed response, one or more relevant documents 176 and associated relevancy scores.

In the illustrated embodiment, the data flow process includes transmitting one or more messages (e.g., containing model outputs), including instructions that when executed by the user computing device cause the user computing device to display the data contained within the messages. The data may be displayed on the user interface 162 using the query response interface 162, e.g., as described in greater detail with respect to FIG. 4.

Figure 7:
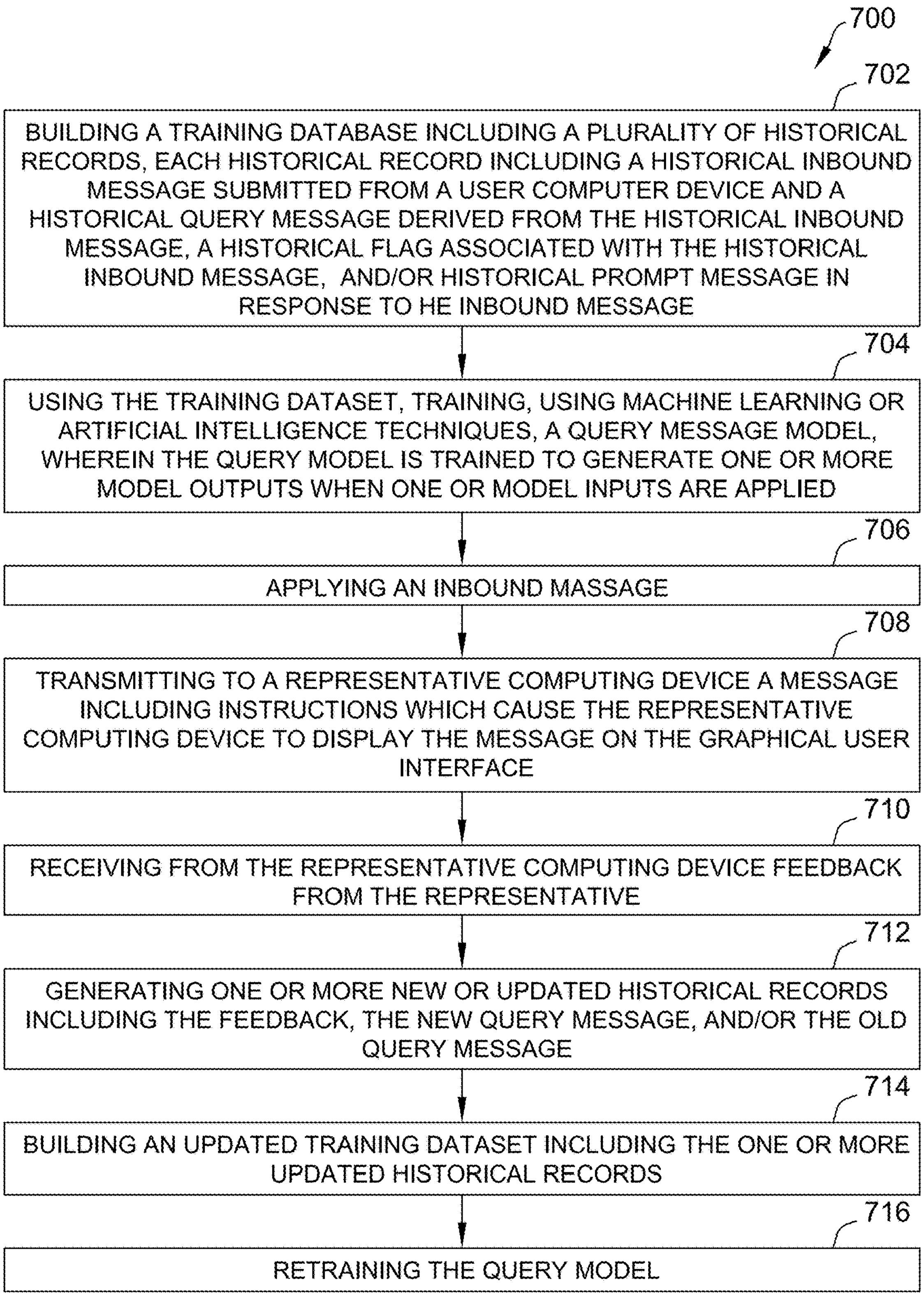
FIG. 7 is an exemplary data flow chart of an exemplary computer-implemented method for generating a query message from an inbound message using the AI-based query response system shown in FIG. 1.

Exemplary Computer-Implemented Method for Screening an Inbound Message to Determine a Query Message FIG. 7 is a flow chart of an exemplary computer-implemented method 700 for screening an inbound message 114 to determine a query message 120.

In certain embodiments, method 700 include building 702 a training dataset including a plurality of historical records 154. The historical records 154 may include historical inbound messages 114 and historical query messages 120 derived from the inbound messages 114. In some embodiments, historical records 154 may include a historical flag or identifier associated with the historical inbound message 114. In certain embodiments, historical records 154 may include additional or alternative data, such as requestor data associated with the requestor 116 that submitted the inbound message 114 (e.g., demographic data, occupational data, employment information, etc.).

Method 700 may include using the training dataset to train 704, using machine learning or artificial intelligence techniques, a query message model. The query message model may be trained to generate one or more model outputs when one or more model inputs are applied to the query model. Model inputs may include an inbound message 114 and/or requestor data and model outputs may include one or more query messages 120, one or more flags, and/or one or more prompting questions for transmittal to the requestor computing device 140. In some embodiments, method 700 may include parsing inbound messages 114 and/or retrieving metadata of the inbound message 114 to determine requestor data. In some embodiments, the query model is associated with an LLM. In some embodiments, the flags may be associated with a rejection, indicating that the inbound message 114 is too vague to determine if the inbound message 114 contains a query message 120, or the flag may indicate that the requestor 116 should provide additional or alternative inbound messages 114 to assist the method 700 in determining the intended query message 120 of the initial inbound message 114.

Method 700 may include receiving or retrieving an inbound message 114, e.g., from one or more user computing devices 130. In certain embodiments, the method 700 may include monitoring various sources (e.g., social media sites) to retrieve the inbound message 114.

Method 700 may include applying 706 the inbound message 114 to the trained query model, e.g., an AI model, to generate one or more model outputs including one or more query messages 120.

Method 700 may include transmitting 708 one or more messages, e.g., to the representative computing device 144, including instructions that when executed by the associated computing device 144 cause the representative computing device 144 to display, (e.g., via the interface 162) the inbound message 114 and the generated one or more model outputs (e.g., the query messages 120).

Method 700 may include receiving 710, e.g., from the representative 112 computing device, feedback from the associate. The feedback may include a revised query message 120 or an assigned score, indicator, or ranking of the query message 120 generated by the query model. The score, indicator, or ranking of the query message 120 may be associated with how well the representative 112 agrees with the query message 120.

Method 700 may include generating 712 one or more new or updated historical records 154 including new inbound messages 114, new model outputs, and/or feedback.

Method 700 may include building 714 an updated training dataset, including the one or more new or updated historical records 154, and retraining 716 the query model using the updated training dataset.

In some embodiments, if the representative provides negative feedback, method 700 includes generating a new query message, e.g., using the re-trained AI model or by applying the feedback to the existing AI-model. For example, in some embodiments, if the representative provides negative feedback, the negative feedback may be applied to the AI model, e.g., along with the inbound message, to generate one or more model outputs including an updated query message.

Figure 8:
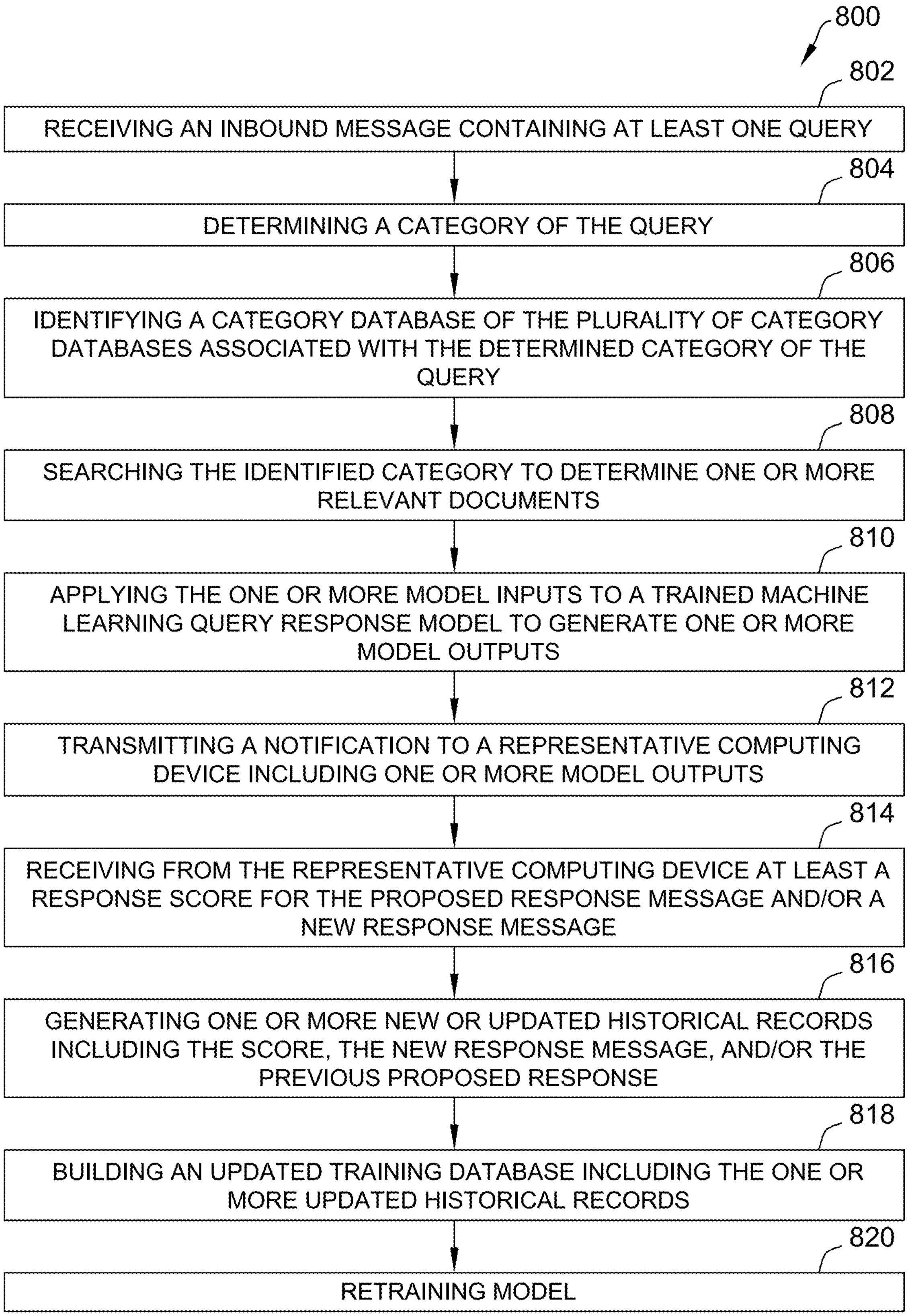
FIG. 8 is an exemplary data flow chart of an exemplary computer-implemented method for generating a proposed response message to a query message using the AI-based query response system shown in FIG. 1.

Method 700 may include using the query message 120 to determine a proposed response message 122 as described in Method 800, FIG. 8.

Exemplary Computer-Implemented Method for Generating A Proposed Repones Message FIG. 8 is a flow chart of an exemplary computer-implemented method 800 for generating a proposed response message to the query message 120 and/or the inbound message 114.

In certain embodiments, method 800 includes building a training dataset including a plurality of historical records 154. The historical records 154 may include historical inbound messages 114, historical query messages 120 derived from the inbound messages 114, and historical response messages 122 that may answer the historical query message 120. Historical records 154 may also include one or more relevant documents 176, and associated relevancy scores, e.g., that were used to generate the historical response message 122. In certain embodiments, historical records 154 may include additional or alternative data, such as requestor data associated with the requestor 116 that submitted the inbound message 114 (e.g., demographic data, occupational data, employment information, etc.).

Method 800 may include using the training dataset to train, using machine learning or artificial intelligence techniques, a query response message model. The query response model may be trained to generate one or more model outputs when one or more model inputs are applied to the query response model. Model inputs may include one or more of the following: inbound messages 114, the query messages 120, one or more categories associated with the query model 152, and/or requestor data. Model outputs may include one or more proposed response messages 122. In some embodiments, the query response model may be trained using categories and relevant documents 176, and the categories and relevant documents 176 may be either model outputs or model inputs. In some embodiments, method 800 may include parsing inbound messages 114 and/or retrieving metadata of the inbound message 114 to determine requestor data. In some embodiments, the query response model is associated with an LLM.

Method 800 may include receiving 802 an inbound message 114 containing at least one query message 120. In embodiments disclosed herein, the inbound message 114 is received from a user computing device to be categorized and responded to. In some embodiments, the inbound message 114 may be parsed and/or otherwise processed (e.g., using a natural language processing model) in order to determine key words or phrases used in the query message 120. In certain embodiments, method 800 may include receiving 802 a query message 120 (e.g., from method 700).

Method 800 may include determining 804 a category of the query message 120. In embodiments disclosed herein, method 800 includes inputting the received inbound message 114 containing at least one query message 120 to a trained category model and using the category model and/or one or more additional techniques to determine a category of the query message 120. The building and training of the category model is described in further detail hereinbelow in conjunction with method 900 of FIG. 9. In some embodiments, the key words and/or phrases determined (e.g., using a natural language processing model) may be used as specific input to the category model in order to determine a category of the query message 120. In embodiments disclosed herein, the category of the query message 120 describes the type of query and/or identifies a type of answer that is requested.

Method 800 may include identifying 806 a category database of the plurality of subject-category databases 172 associated with the determined category of the query message 120. In embodiments disclosed herein, each of the plurality of subject-category databases 172 contains category specific documents and/or other relevant material that may be relied upon to answer query messages 120 of that particular category. The building of the one or more subject-category databases 172 is further described herein below with respect to method 900 of FIG. 9.

Method 800 may include searching 808 the identified category to determine one or more relevant documents. In embodiments disclosed herein, the one or more relevant documents include information pertaining, or responsive, to the at least one query message 120, and the one or more relevant documents include a relevancy score associated with how pertinent the document is to the at least one query message 120. In certain embodiments, the document relevancy scores may be determined by the category model and/or one or more additional or alternative techniques, such as a comparison between one or more keywords contained within the query message 120 or inbound message 114 and corresponding keywords contained in the documents. In some embodiments, the category model may evaluate the proximity of one or more keywords to other or alternative keywords in order to generate the document relevancy score. For example, the closer in proximity (e.g., using a linear distance) keywords are contained within the document, the higher the document relevancy score. As mentioned above, the category model may be a LLM and/or is associated with an LLM, and the category model may apply, or input, model inputs and/or receive model outputs that are encrypted to conceal confidential data contained within model inputs and/or model outputs. Additionally, or alternatively, a LLM may be re-trained or re-tuned, e.g., using subject-category databases 172, relevant documents, and scores, etc., and the updated LLM may only be utilized within the context of the AI query response system 100.

In some embodiments, method 800 includes receiving categories, relevant documents 176, and/or relevancy scores (e.g., obtained from method 900).

Method 800 includes applying 810 one more model inputs to the trained query response model to determine one or more model outputs including the proposed response message. Method 800 may include applying a query message 120, in real-time, to the query response model. In some embodiments, the method 800 may include applying the inbound message 114 to the query response model. In some embodiments, method 800 may include applying the one or more determined relevant documents 176 and the associated relevancy score for each of the relevant documents 176 to the trained machine learning response model. Additionally, in embodiments disclosed herein, the one or more relevant documents 176 may be ranked in order of their relevancy scores (e.g., with the most relevant document being applied to the model with a higher weighting factor compared to less relevant documents 176).

Method 800 may include transmitting 812 a notification message to a user computing device 130. In embodiments disclosed herein, the notification message includes one or more of the following: the proposed response message, the determined one or more relevant documents 176, and the relevancy score associated with the each of the determined one or more relevant documents 176. Furthermore, in embodiments disclosed herein, the notification message is displayed on a user computing device 130 via the interface 162. In some embodiments, the notification message may be displayed as a chat message (e.g., from a representative computing device), in response to which a user of the user computing device may submit a response and/or a follow up query.

Method 800 may include receiving 814, e.g., from the representative computing device 144, feedback from the representative 112. The feedback may include at least a response indicator or score the proposed response, a new response (e.g., as drafted by the associate). Method 800 includes comparing the new response message to the proposed response message 122 to determine a response message score or indicator. The score, indicator, or ranking of the proposed response message may be associated with how well the representative 112 agrees with the query message 120.

Method 800 may include generating 816 one or more new or updated historical records 154 including new inbound messages 114, new model outputs, and/or feedback.

Method 800 may include building 818 an updated training dataset, including the one or more new or updated historical records 154, and retraining 820 the query response model using the updated training dataset.

In some embodiments, if the representative provides negative feedback, method 800 includes generating a new or updated response message, e.g., using the re-trained AI model or by applying the feedback to the existing AI-model. In some embodiments, if the representative provides negative feedback, the negative feedback may be applied to the AI model, e.g., along with the inbound message or query message, to generate one or more model outputs including an updated or new response message. For example, if the representative assigns a low relevancy score to a previously identified relevant document 176, the AI model may not utilize this low relevancy scored document during subsequent generation of a proposed response message.

Figure 9A:
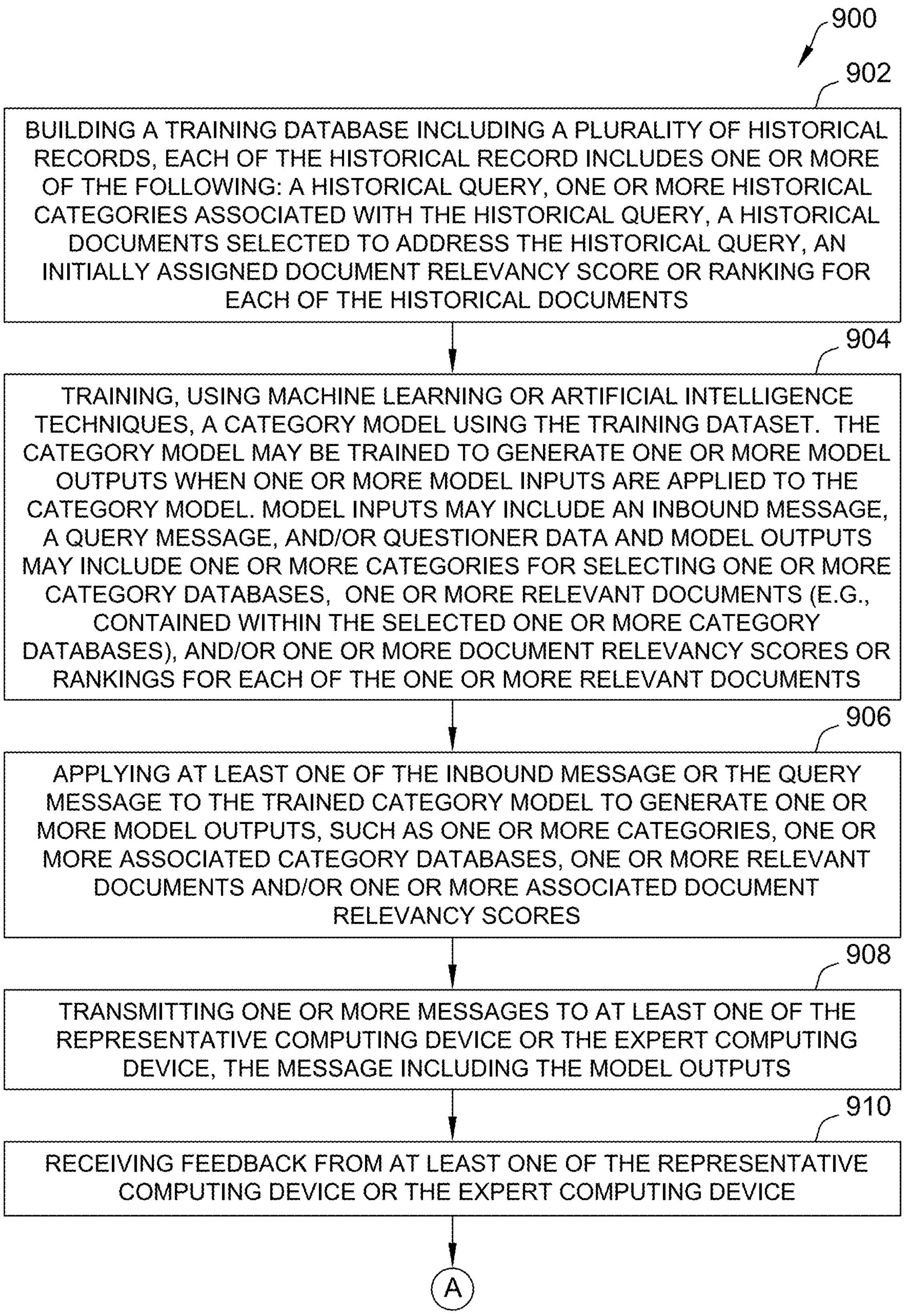
FIGS. 9A and 9B show an exemplary data flow chart of an exemplary computer-implemented method for determining a category database and relevant documents in response to a query message using the AI-based query response system shown in FIG. 1.
Figure 9B:
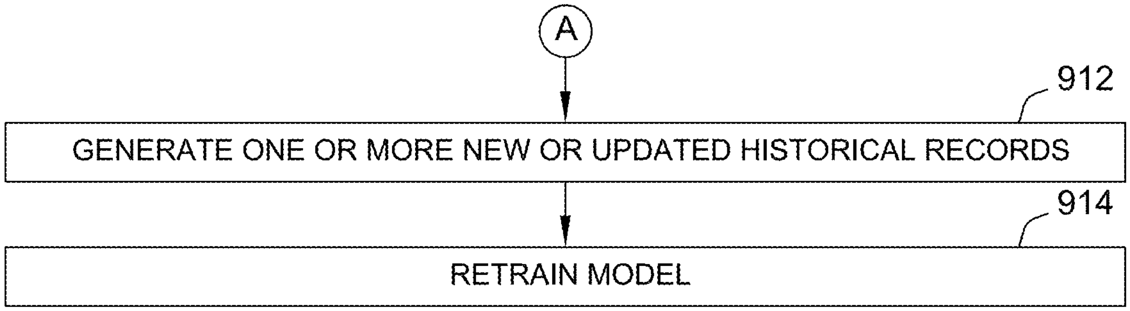

Exemplary Computer-Implemented Method for Determining a Subject Matter Category and One or More Relevant Documents FIGS. 9A and 9B show a flow chart of an exemplary computer-implemented method for determining a category database 172 and relevant documents 176.

Method 900 may include building 902 a training dataset including a plurality of historical records 154. Each of the historical records 154 includes one or more of the following: a historical query message 120, one or more historical categories associated with the historical query message 120, a historical documents selected to address the historical query message 120, an initially assigned document relevancy score or ranking for each of the historical documents. The initially assigned document relevancy score may have been initially assigned by one or more subject matter experts 118, one or more of the associates, and/or one or more model, described below.

In certain embodiments, method 900 may include building the one or more subject-category databases 172 by generating, sorting, and/or storing category specific documents within a category database 172 of the associated category. In some embodiments, the method 900 includes receiving one or more documents from an expert computing devices 142 to be sorted and/or stored within a category database 172. The method 900 may include parsing documents to determine which category database 172 that the documents should be stored within. In certain embodiments, the method 900 may include determining a category associated with the subject matter expert 118 and using determined category of the expert 118 to organize the documents received therefrom. In certain embodiments, method 900 may include using metadata from the receive documents to determine a category of the subject matter expert 118.

In certain embodiments, the document relevancy scores may be determined by the category model and/or one or more additional or alternative techniques, such as a comparison between one or more keywords contained within the query message 120 or inbound message 114 and corresponding keywords contained in the documents. In some embodiments, the category model may evaluate the proximity of one or more keywords to other or alternative keywords in order to generate the document relevancy score. For example, the closer in proximity (e.g., using a linear distance) keywords are contained within the document, the higher the document relevancy score. As mentioned above, the category model may be a LLM and/or is associated with an LLM, and the category model may apply model inputs and/or receive model outputs that are encrypted to conceal confidential data contained within model inputs and/or model outputs.

Method 900 may include training 904, using machine learning or artificial intelligence techniques, a category model using the training dataset. The category model may be trained to generate one or more model outputs when one or more model inputs are applied to the category model. Model inputs may include an inbound message 114, a query message 120, and/or requestor data and model outputs may include one or more categories for selecting one or more subject-category databases 172, one or more relevant documents 176 (e.g., contained within the selected one or more subject-category databases 172), and/or one or more document relevancy scores or rankings for each of the one or more relevant documents 176. In some embodiments, method 900 may include parsing inbound messages 114 and/or retrieving metadata of the inbound message 114 to determine requestor data. In some embodiments, the category model is associated with an LLM.

Method 900 may include receiving or retrieving an inbound message 114, e.g., from one or more user computing devices and/or receiving or retrieving a query message 120, e.g., as determined by the query model. In certain embodiments, the method 900 may include monitoring various sources (e.g., social media sites) to retrieve the inbound message 114.

Method 900 may include applying 906 at least one of the inbound message 114 or the query message 120 to the trained category model to generate one or more model outputs, such as one or more categories, one or more associated subject-category databases 172, one or more relevant documents 176 and/or one or more associated document relevancy scores.

Method 900 may include transmitting 908 one or more messages to a user computing device, e.g., the representative computing device 144 or the expert computing device 142, the message including instructions that when executed by the user computing device cause the user computing device to display, (e.g., via the interface 162) the generated one or more model outputs, e.g., the category, the category database 172, relevant documents 176, and/or document relevancy scores.

Method 900 may include receiving 910 from a user computing device e.g., from the representative computing device 144 and/or the expert computing device 142, feedback from a user, e.g., feedback from the representative 112 and/or feedback from the expert 118. The feedback may include revised or alternative categories and/or revised or alternative subject-category databases 172, revised, or alternative relevant documents 176, and/or revised or alternative scores (e.g., referred to as updated scores) for one or more of the relevant documents 176. The updated scores, assigned by the representative 112, may serve as an indication of how well the representative 112 agrees with the category and/or how relevant the representative 112 agrees with the relevancy of the relevant documents 176.

In certain embodiments, method 900 may include comparing the initial document relevancy score (e.g., obtained from the model output from the category model) and/or the updated document relevancy scores (e.g., received as feedback form the representative 112 computing device or the expert computing device 142) may be compared to a score criterion, and if the criterion is satisfied, then method 900 may include one or more addition or alternative steps. For example, the method may determine that one or more of the document relevancy scores is less than a suitable threshold score (e.g., the document relevancy score is too low serving as an indication that the relevant document is not very relevant), and then method 900 includes identifying one or more subject matter experts 118, e.g., that may be able to assist with identifying different documents that may improve the document relevancy score and/or the subject matter expert 118 may be able to submit new or revised documents that are more relevant to the query message 120 and/or the inbound message 114. In certain embodiments, method 900 includes receiving or retrieving one or more documents, document relevancy scores, identified categories from one or more expert computing devices 142 associated with one or more subject matter experts 118.

Method 900 may include comparing a document relevancy score as determined by the category model to a newly assigned document relevancy score, received from the representative computing device 144 and/or the expert computing device 142. The method 900 may determining if the comparison satisfies a criterion. For example, if the model determined score is significantly different that the new score assigned by the representative 112 or the expert 118, then method 900 includes identifying one or more subject matter experts 118, e.g., that may be able to assist with identifying different documents that may improve the document relevancy score and/or the subject matter expert 118 may be able to submit new or revised documents that are more relevant to the query message 120 and/or the inbound message 114). In certain embodiments, method 900 includes receiving or retrieving one or more documents, document relevancy scores, identified categories from one or more expert computing devices 142 associated with one or more subject matter experts 118.

In certain embodiments, method 900 may include generating 912 new or updated historical records 154 including revised or alternative relevant documents 176, revised categories, revised or alternative document relevancy scores. The new historical records 154 may also include both the initially assigned document relevancy score and newly assigned document relevancy scores, e.g., assigned by the representative 112 and/or subject matter expert 118.

In certain embodiments, method 900 may include building an updated training dataset, using the new or updated historical records 154, and retraining 914 the category model using the updated training dataset.

ADDITIONAL CONSIDERATIONS

As will be appreciated based on the foregoing specification, the above-described embodiments of the disclosure may be implemented using computer programming or engineering techniques including computer software, firmware, hardware or any combination or subset thereof. Any such resulting program, having computer-readable code means, may be embodied, or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer-readable medium. In an example embodiment, the system is executed on a single computer system, without requiring a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. An AI-based computing system for responding in real-time to an inbound message, the AI-based computing system comprising:

at least one memory for storing a plurality of subject-category databases, wherein each subject-category database includes one or more documents associated with a respective subject-category of the subject-category database; and at least one processor in communication with the at least one memory, the at least one processor programmed to:

cause to display, within a graphical user interface of a representative computing device, i) a proposed response message responsive to a query message derived from a current inbound message submitted by a user, the proposed response message being generated by an AI response model, ii) a link to one or more relevant documents retrieved from a corresponding subject-category database, and iii) a feedback input enabling a representative to assign a response indicator to the proposed response message;

receive, from the representative computing device, the response indicator assigned by the representative via the feedback input;

in response to receiving the response indicator, identify, using the AI response model, an expert computing device associated with a subject matter expert, wherein the subject matter expert is associated with a subject-category of the query message;

receive, from the expert computing device, an updated response indicator to the proposed response message, the updated response indicator assigned by the subject matter expert;

create a historical record including the proposed response message and the updated response indicator;

generate a training dataset including a plurality of historical records;

using machine learning and/or artificial intelligence tools, re-train the AI response model using the training dataset; and in response to a request for a revised response message, cause to display, within the graphical user interface of the representative computing device, in real-time, the revised response message responsive to the current inbound message using the re-trained AI response model.

2. The AI-based computing system of claim 1, wherein the at least one processor is further programmed to transmit the revised response message to a user computing device associated with the user who submitted the inbound message.

3. The AI-based computing system of claim 1, wherein the feedback input includes a first virtual button assigning a positive response indicator indicating that the representative confirms that the proposed response message is responsive to the query message and a second virtual button assigning a negative response indictor indicating that the representative confirms that the proposed response message is not responsive to the query message, wherein the first virtual button is in a shape of a thumbs up graphic and wherein the second virtual button is in a shape of a thumbs down graphic.

4. The AI-based computing system of claim 1, wherein the at least one processor is further programmed to:

cause to display, within the graphical user interface, the feedback input that includes a data field for inputting a relevancy score assigned to each of the one or more relevant documents;

receive, from the representative computing device, an assigned relevancy score for one or more of the relevant documents assigned by the representative via the feedback input; and create an additional historical record including the assigned relevancy score and the one or more relevant documents.

5. The AI-based computing system of claim 1, wherein the at least one processor is further programmed to:

cause to display, within the graphical user interface of the representative computing device, a conversation panel displaying messages between the representative and the user, wherein the conversation panel displays one or more inbound messages submitted by the user.

6. The AI-based computing system of claim 5, wherein the at least one processor is further programmed to:

input the one or more inbound messages to a query model to generate one or more outputs including the query message; and cause to display, within the graphical user interface of the representative computing device, i) the one or more inbound messages, and ii) the query message derived from the one or more inbound messages.

7. The AI-based computing system of claim 1, wherein the at least one processor is further programmed to:

cause to display, within the graphical user interface of the representative computing device, a conversation panel between the subject matter expert and the representative, wherein the subject matter expert is an author of the one or more documents contained within the subject-category databases.

8. The AI-based computing system of claim 1, wherein the at least one processor is further programmed to:

cause to display, within the graphical user interface of the representative computing device, i) a conversation panel displaying messages between the representative and the user, wherein the conversation panel displays one or more inbound messages submitted by the user, and ii) a message transfer input configured to enable the representative to transfer the proposed response message to the conversation panel; and responsive to the representative selecting the message transfer input, populate an outbound message associated with the conversation panel for sending the proposed response message to the user.

9. An AI computer-based method for responding in real-time to an inbound message, the AI computer-based method comprising:

causing to display, within a graphical user interface of a representative computing device, i) a proposed response message responsive to a query message derived from a current inbound message submitted by a user, the proposed response message being generated by an AI response model, ii) a link to one or more relevant documents retrieved from a corresponding subject-category database, and iii) a feedback input enabling a representative to assign a response indicator to the proposed response message;

receiving, from the representative computing device, the response indicator for the proposed response message assigned by the representative via the feedback input;

in response to receiving the response indicator, identifying, using the AI response model, an expert computing device associated with a subject matter expert, wherein the subject matter expert is associated with a subject-category of the query message;

receiving, from the expert computing device, an updated response indicator to the proposed response message, the updated response indicator assigned by the subject matter expert;

creating a historical record including the proposed response message and the response updated indicator;

generating a training dataset including a plurality of historical records;

using machine learning and/or artificial intelligence tools, re-training the AI response model using the training dataset; and in response to a request for a revised response message, causing to display, within the graphical user interface of the representative computing device, in real-time, the revised response message responsive to the current inbound message using the re-trained AI response model.

10. The AI computer-based method of claim 9 further comprising:

transmitting the revised response message to a user computing device associated with the user who submitted the inbound message.

11. The AI computer-based method of claim 9, wherein the feedback input includes a first virtual button assigning a positive response indicator indicating that the representative confirms that the proposed response message is responsive to the query message and a second virtual button assigning a negative response indictor indicating that the representative confirms that the proposed response message is not responsive to the query message, wherein the first virtual button is in a shape of a thumbs up graphic and wherein the second virtual button is in a shape of a thumbs down graphic.

12. The AI computer-based method of claim 9 further comprising:

causing to display, within the graphical user interface, the feedback input that includes a data field for inputting a relevancy score assigned to each of the one or more relevant documents;

receiving, from the representative computing device, an assigned relevancy score for one or more of the relevant documents assigned by the representative via the feedback input; and creating an additional historical record including the assigned relevancy score and the one or more relevant documents.

13. The AI computer-based method of claim 9 further comprising:

causing to display, within the graphical user interface of the representative computing device, a conversation panel displaying messages between the representative and the user, wherein the conversation panel displays one or more inbound messages submitted by the user.

14. The AI computer-based method of claim 13 further comprising:

inputting the one or more inbound messages to a query model to generate one or more outputs including the query message; and causing to display, within the graphical user interface of the representative computing device, i) the one or more inbound messages, and ii) the query message derived from the one or more inbound messages.

15. At least one non-transitory computer-readable storage media medium having computer-executable instructions embodied thereon for responding in real-time to an inbound message, wherein when executed by a processor, the computer-executable instructions cause the processor to:

cause to display, within a graphical user interface of a representative computing device, i) a proposed response message responsive to a query message derived from a current inbound message submitted by a user, the proposed response message being generated by an AI response model, ii) a link to one or more relevant documents retrieved from a corresponding subject-category database, and iii) a feedback input enabling a representative to assign a response indicator to the proposed response message;

receive, from the representative computing device, the response indicator for the proposed response message assigned by the representative via the feedback input;

in response to receiving the response indicator, identify, using the AI response model, an expert computing device associated with a subject matter expert, wherein the subject matter expert is associated with a subject-category of the query message;

receive, from the expert computing device, an updated response indicator to the proposed response message, the updated response indicator assigned by the subject matter expert;

create a historical record including the proposed response message and the updated response indicator;

generate a training dataset including a plurality of historical records;

using machine learning and/or artificial intelligence tools, re-train the AI response model using the training dataset; and in response to a request for a revised response message, cause to display, within the graphical user interface of the representative computing device, in real-time, the revised response message responsive to the current inbound message using the re-trained AI response model.

16. The computer-readable storage medium of claim 15, wherein the computer-executable instructions cause the processor to:

transmit the revised response message to a user computing device associated with the user who submitted the inbound message.

17. The computer-readable storage medium of claim 15, wherein the feedback input includes a first virtual button assigning a positive response indicator indicating that the representative confirms that the proposed response message is responsive to the query message and a second virtual button assigning a negative response indictor indicating that the representative confirms that the proposed response message is not responsive to the query message, wherein the first virtual button is in a shape of a thumbs up graphic and wherein the second virtual button is in a shape of a thumbs down graphic.

18. The computer-readable storage medium of claim 15, wherein the computer-executable instructions cause the processor to:

cause to display, within the graphical user interface, the feedback input that includes a data field for inputting a relevancy score assigned to each of the one or more relevant documents;

receive, from the representative computing device, an assigned relevancy score for one or more of the relevant documents assigned by the representative via the feedback input; and create an additional historical record including the assigned relevancy score and the one or more relevant documents.

19. The computer-readable storage medium of claim 15, wherein the computer-executable instructions cause the processor to:

cause to display, within the graphical user interface of the representative computing device, a conversation panel displaying messages between the representative and the user, wherein the conversation panel displays one or more inbound messages submitted by the user.

20. The computer-readable storage medium of claim 19, wherein the computer-executable instructions cause the processor to:

input the one or more inbound messages to a query model to generate one or more outputs including the query message; and cause to display, within the graphical user interface of the representative computing device, i) the one or more inbound messages, and ii) the query message derived from the one or more inbound messages.

* * * * *